(12) United States Patent  
Beal

(10) Patent No.: US 7,533,895 B2  
(45) Date of Patent: May 19, 2009

(54) FLEXIBLE FRAME FOR BICYCLE AND THE LIKE

(76) Inventor: Bentley Beal, 3739 Carnegie Dr., Oceanside, CA (US) 92056

(*) Notice: Subject to any disclaimer, the term of this patent is extended or adjusted under 35 U.S.C. 154(b) by 470 days.

(21) Appl. No.: 11/022,606

(22) Filed: Dec. 27, 2004

(65) Prior Publication Data
US 2006/0138743 A1    Jun. 29, 2006

(51) Int. Cl.
*B62K 21/02* (2006.01)
(52) U.S. Cl. ................................ 280/276; 280/283
(58) Field of Classification Search ......... 280/275–277, 280/279, 283–286
See application file for complete search history.

(56) References Cited

U.S. PATENT DOCUMENTS

| | | | |
|---|---|---|---|
| 441,649 A | 12/1890 | Dunlop | |
| 509,122 A * | 11/1893 | Faussereau | 280/238 |
| 591,306 A | 10/1897 | Tolson | |
| 603,006 A * | 4/1898 | Demarest | 280/274 |
| 621,942 A * | 3/1899 | Pierce | 280/276 |
| 687,216 A | 11/1901 | Foreman | |
| 699,376 A | 5/1902 | Errick | |
| 1,045,025 A | 11/1912 | Heroguez | |
| 1,114,855 A * | 10/1914 | Buckland | 280/275 |
| 1,849,937 A | 3/1932 | Lander | |
| 2,107,251 A * | 2/1938 | Peace | 280/284 |
| 2,178,939 A | 11/1939 | Pease | |
| 4,453,730 A | 6/1984 | Klose | |
| 4,669,747 A | 6/1987 | Groendal | |
| 4,792,150 A | 12/1988 | Groendal et al. | |
| 4,838,569 A * | 6/1989 | Ford | 280/275 |
| 4,909,537 A | 3/1990 | Tratner | |
| 5,462,140 A * | 10/1995 | Cazort et al. | 188/275 |
| 5,833,258 A | 11/1998 | Maestripieri | |
| 6,168,179 B1 * | 1/2001 | Yu | 280/274 |
| 6,270,104 B1 | 8/2001 | Nelson et al. | |
| 6,607,185 B2 * | 8/2003 | Graves et al. | 267/64.26 |

* cited by examiner

Primary Examiner—Anne Marie M. Boehler

(57) ABSTRACT

One aspect of the present invention is comprised of a flexible rear frame member for a bicycle or velocipede. Other embodiments of the invention also include one or more assemblies, such as a rear wheel assembly, a seat assembly, a crank assembly, and strut members, which are adapted to be attached to the flexible rear frame member. A second aspect is a flexible front frame member, which may be pivotally attached to the flexible rear frame member. Other embodiments of this second aspect of the invention may also include one or more assemblies, such as a front wheel assembly and front strut members, which are adapted to be attached to the flexible front frame member. In some embodiments of the invention, the flexible rear frame member and the flexible front frame member, along with their respective assemblies, may together comprise a bicycle or velocipede.

7 Claims, 20 Drawing Sheets

FLEXIBLE FRAME FOR BICYCLE AND THE LIKE

BACKGROUND

The present invention generally relates to a bicycle or velocipede and its component parts, and more specifically to flexible frame members and modularized assemblies, such as a front wheel assembly, a rear wheel assembly, a seat assembly, a crank assembly, and strut members, which are adapted to be attached to and operate as a part of such flexible frame members, wherein the flexible frame members and such modularized assemblies may together comprise a bicycle or velocipede.

There currently exist many bicycle-type devices in the relevant art. Many of these bicycles have frames that are designed to have a high degree of strength and stiffness. Other types of bicycles have frames that are designed to have some degree of flexibility. Usually, the flexible component of such frames exists for the purpose of dampening shocks that occur as the bicycle is ridden over rough terrain, providing a smoother ride for the bicycle operator. These types of bicycles are typically comprised of a combination of relatively stiff components and relatively flexible components connected by pins, levers, and springs. Nevertheless, with few exceptions, bicycles that are ridden in the traditional manner in which the operator sits in an upright position generally tend to have a triangular-shaped frame that is the same in appearance from bicycle to bicycle.

There are, however, persons who prefer to ride bicycles having a unique appearance. For example, it may be desirable to ride a bicycle having a frame with a shape different from that of the standard triangle shape. It may also be desirable for the frame to have an artistic appearance that is aesthetically pleasing. In addition, it may be desirable to have a bicycle that has a frame that is comprised almost entirely of flexible components. This may also be the case where a person desires to ride a bicycle that is different from the type normally ridden by others. This may also be the case where the bicycle operator desires as smooth a ride as possible while riding the bicycle over any surface that is not smooth. In such cases, however, the bicycle must also have means to provide the level of support necessary to support the bicycle, its constituent components, and its operator. In addition, it may be desirable to have a bicycle designed to be inherently flexible to prevent breakage with stiffness added where necessary to provide required support, rather than a bicycle designed to be inherently rigid with additional flexibility added to prevent breakage and provide necessary flexure. It may also be desirable that the bicycle frame have the appearance of natural flexibility, rather than being comprised of naturally inflexible components that are joined together in an aesthetically awkward manner to provide flexibility.

In addition, it is also desirable to have a bicycle that has modularized components that are simple in construction and standard in form from bicycle to bicycle. This modularization would provide for simple and fast bicycle fabrication, reducing the cost of such fabrication. It would also reduce the time and expense required to repair the bicycle and change modular components, and provide a means to easily remove components for ease of transportation and storage. Many conventional bicycles do not possess these features.

SUMMARY

The present invention is directed to flexible members comprising a bicycle frame, and certain constituent assemblies that attach to the frame, that meet the needs discussed above in the Background section. As described in greater detail below, the present invention, when used for its intended purposes, has many advantages over other devices known in the art, as well as novel features that result in new bicycle frame members and component assemblies that are not anticipated, rendered obvious, suggested, or even implied by any prior art devices, either alone or in any combination thereof.

A first version of the present invention generally discloses a first aspect of a bicycle frame comprised of a rear frame member, which is further comprised of a rear frame head portion, a downward frame portion, a distal frame portion, and a top frame portion. In some embodiments of this aspect of the first version of the invention, the rear frame head portion may be located adjacent to the steering mechanism of the bicycle. The downward frame portion extends generally downwardly in a rearward direction from the rear frame head portion to the position of a crank assembly, which is described in more detail below. The distal frame portion extends in a rearward direction from the position of the crank assembly and is bifurcated into two rear parallel portions rearward of the position of the crank assembly to permit a rear bicycle wheel to fit between them. It is to be noted that by use of the term "parallel" to describe the two rear parallel portions, it is intended that they may generally mirror one another in shape and need not necessarily be spaced an equal distance apart. The two rear parallel portions extend rearwardly from the position of the crank assembly, then upwardly, and then forwardly, where they are joined together into a single portion, which extends forwardly to the position of a seat assembly, which is described in more detail below. In some embodiments of this first version of the invention, the distal frame portion generally circumscribes an arc. In other embodiments, the distal frame portion extends rearwardly and upwardly to a point, from which point the distal frame portion extends upwardly and forwardly to the seat assembly, such portions of the distal frame portion forming an angle of less than 90 degrees at such point. The top frame portion generally extends forwardly from the position of the seat assembly to the rear frame head portion.

In some embodiments of this first aspect of the first version of the invention, the rear frame head portion, the downward frame portion, the distal frame portion, and the top frame portion are comprised of materials from the group consisting of flexible materials, semi-rigid materials, and combinations of such materials. In some of these embodiments the rear frame head portion, the downward frame portion, the distal frame portion, and the top frame portion are comprised of titanium, steel, steel alloys, or aluminum. In yet other embodiments, the rear frame head portion, the downward frame portion, the distal frame portion, and the top frame portion are comprised of a carbon-based composite material. In other embodiments, the rear frame head portion, the downward frame portion, the distal frame portion, and the top frame portion are comprised of a wood laminate. In other embodiments, the rear frame head portion, the downward frame portion, the distal frame portion, and the top frame portion are comprised of carbon fiber composites, steel, steel alloys, aluminum, titanium, fiberglass, plastic, rubber, or wood or laminates or any combinations of the same. In still other embodiments, the rear frame head portion, the downward frame portion, the distal frame portion, and the top frame portion each have a cross section shaped as a circle or an ellipse, or a square, a rectangle, a parallelogram, a trapezoid, or a variation thereof having one or more concave or convex arched surfaces, or any combination of one or more of all such shapes.

In some embodiments of this first aspect of the first version of the invention, the rear frame member further comprises a crank assembly and crank assembly attachment means to attach the crank assembly to the rear frame member at the position of the crank assembly on the downward frame portion of the rear frame member where it meets the distal frame portion of the rear frame member. In some of these embodiments, the crank assembly is comprised of a top crank bracket approximating a U-shape, a cylindrical tubular member, and crank bracket/tube attachment means to connect the tubular member to the top bracket. In some of these embodiments, the crank assembly is further comprised of at least two bail members, at least one bottom plate, and bail attachment means to attach the at least two bail members to the bottom plate. In these embodiments, the crank assembly attachment means is comprised of the at least two bail members being placed over the tubular member and being secured to the bottom plate by the bail attachment means in a manner so that the downward frame portion is held between the top crank bracket and the bottom plate. In other embodiments, the downward frame portion has at least one pin and the top crank bracket has the same number of holes as the number of such at least one pin and the holes receive the at least one pin to hold the crank assembly in place relative to the downward frame portion. In yet other embodiments, the top crank bracket has at least one pin and the downward frame portion has the same number of holes as the number of such at least one pin and the holes receive the at least one pin to hold the crank assembly in place relative to the downward frame portion. In still other embodiments, the crank assembly further comprises a strip member and means to attach the strip member to the downward frame portion, wherein the strip member and the surface of the top crank bracket have a pattern of corresponding indentations to hold the crank assembly in place relative to the downward frame portion. In further embodiments, the crank assembly attachment means is comprised of bolts that attach the top crank bracket to the downward frame portion. In yet other embodiments, the crank assembly further comprises a gear drive member and gear drive member attachment means to attach the gear drive member to the cylindrical tubular member. In some embodiments, the gear drive member is further comprised of a crank shaft, two pedal members, and a chain drive member, wherein the chain drive member is attached to the rear wheel assembly to provide power to rotate the rear bicycle wheel portion of the rear wheel assembly, as described in more detail below. In some embodiments the crank assembly may be mounted upside down below the downward frame portion rather than above the downward frame portion. In other embodiments, the means of connecting the crank assembly to the rear frame member, such as the top crank bracket, may be comprised of a similar bracket laminated or molded into the rear frame member as a part thereof.

In some embodiments of this first aspect of the first version of the invention, the rear frame member further comprises a rear wheel assembly and rear wheel assembly attachment means to attach the rear wheel assembly to the rearwardly extending portion of the rear parallel portions of the distal frame portion of the rear frame member. In some of these embodiments, the rear wheel assembly is comprised of at least two rear wheel assembly clamp members, a cylindrical rear wheel axle member, a rear bicycle wheel, rear wheel mounting means to rotationally mount the rear bicycle wheel on the rear wheel axle member, and rear wheel axle attachment means to connect the rear wheel axle member to the at least two rear wheel assembly clamp members. In such embodiments, each of the at least two rear wheel assembly clamp members are attached to one of the rear parallel portions of the distal frame portion on opposite sides of the rear bicycle wheel, and the rear wheel axle member has two ends and extends between the at least two rear wheel assembly clamp members. In some of these embodiments, the at least two rear wheel clamp members are each comprised of a rear wheel assembly outer plate, a rear wheel assembly inner plate, and rear wheel clamp attachment means to connect the rear wheel assembly outer plate to the rear wheel assembly inner plate in a manner so that the rear parallel portion is held in place by the rear wheel assembly inner plate and the rear wheel assembly outer plate. In these embodiments, the rear wheel assembly outer plate is comprised of a first outer vertical plate portion having a flat surface, a second outer vertical plate portion having a flat surface parallel to the first outer vertical plate portion, and a horizontal outer plate portion extending perpendicular from the flat surface at one end of the first outer vertical plate portion to the flat surface at one end of the second outer vertical plate portion. This creates an approximately U-shaped rear wheel assembly outer plate, with the outer horizontal plate portion having a flat interior surface. In these embodiments, the rear wheel assembly inner plate is comprised of an inner vertical plate portion having a flat surface and a horizontal inner plate portion extending perpendicular from the flat surface at one end of the first inner vertical plate portion creating an approximately L-shaped member, wherein the exterior surface of the horizontal inner plate portion is flat. In these embodiments, when the rear wheel assembly inner plate is attached to the rear wheel assembly outer plate using the rear wheel clamp attachment means, the flat surface of the first outer vertical plate portion is placed adjacent to the flat surface of the inner vertical plate portion and the flat interior surface of the horizontal outer plate portion and the flat exterior surface of the horizontal inner plate are placed adjacent to the rear parallel portion of the distal frame portion to which the rear wheel clamp member is attached so that the rear parallel portion is held in place frictionally by the rear wheel assembly inner plate and the rear wheel assembly outer plate. In some of these embodiments, each rear parallel portion of the distal frame portion has at least two pins and the rear wheel assembly clamp member has the same number of holes as the number of such pins and the holes receive the pins to hold the rear wheel assembly in place relative to the rear parallel portion. In other embodiments, the rear wheel assembly clamp member has at least one pin and each rear parallel portion of the distal frame portion has the same number of holes as the number of such at least one pin and the holes receive the at least one pin to hold the rear wheel assembly in place relative to the rear parallel portion. In yet other embodiments, the means of connecting the rear wheel assembly to the rear frame member, such as the rear wheel assembly clamp members, may be comprised of a similar member laminated or molded into the rear frame member as a part thereof. In some embodiments, the rear wheel assembly further comprises at least one disc brake member and disc brake attachment means to attach the at least one disc brake member to one or more of the at least two rear wheel assembly clamp members. In other embodiments, the rear wheel assembly further comprises a gear drive mechanism, which is attached to the chain drive member, providing power to rotate the rear bicycle wheel. In some of these embodiments, the gear drive mechanism is further comprised of at least two gear members, a derailleur member, and a gear control mechanism, wherein the chain drive member may be removably attached to more than one of the at least two gear members by manipulation of the gear control mechanism. In other embodiments, the chain drive is connected to a simple rear sprocket and coaster break rear drive mechanism without provision for multiple gears.

In some embodiments of this first aspect of the first version of the invention, the rear frame member further comprises a seat assembly and seat assembly attachment means to attach the seat assembly to the rear frame member at the position of the seat assembly on the forwardly extending portion of the distal frame portion of the rear frame member where it meets the top frame portion of the rear frame member. In some of these embodiments, the seat assembly is comprised of an approximately U-shaped outer bracket member, an approximately U-shaped inner bracket member, seat bracket connecting means to connect the outer bracket member to the inner bracket member, a seat member, and seat member attachment means to attach the seat member to the outer bracket member. In these embodiments, the internal horizontal surface of the outer bracket member is placed adjacent to the top surface of the distal frame portion, the external horizontal surface of the inner bracket member is placed adjacent to the bottom surface of the distal frame portion, and the seat bracket connecting means connects the outer bracket member to the inner bracket member in a manner so that the portion of the distal frame portion to which the seat assembly is attached is held in place between the outer bracket member and the inner bracket member. In other embodiments, the means of connecting the seat assembly to the rear frame member, such as the inner and outer bracket members, may be comprised of one or more similar members laminated or molded into the rear frame member as a part thereof. In some embodiments, the seat member is comprised of at least two seat rod tube members, seat rod tube attachment means to attach the at least two seat rod tube members to the outer bracket member (which is also the seat member attachment means in these embodiments), a seat post comprised of at least two seat rods, seat post attachment means to slideably attach the at least two seat rods to the at least two seat rod tube members in a manner so that the seat post is supported by the at least two seat rod tube members, a bicycle seat, and bicycle seat attachment means to attach the bicycle seat to the seat post in a manner so that the bicycle seat is supported by the seat post.

In other embodiments of this first aspect of the first version of the invention, the rear frame member is also comprised of at least one rear strut member having a top end and a bottom end, top rear strut connector means to connect the top end of the at least one rear strut member to approximately the seat assembly, and bottom rear strut connector means to connect the bottom end of the at least one rear strut member to approximately the crank assembly. In some of these embodiments, the at least one rear strut member is comprised of a piston tube assembly and a strut shroud member covering the piston tube assembly. In some of these embodiments, the piston tube assembly is comprised of a piston rod member, a piston tube member, a top valve monoblock member, a bottom valve monoblock member, a bottom strut support member, and a rod guide member. In these embodiments, monoblock/piston tube attachment means are used to attach the top valve monoblock member to one end of the piston tube member and to attach the bottom valve monoblock member to the other end of the piston tube member. In addition, in these embodiments, bottom monoblock/support attachment means are used to attach the bottom strut support member to the bottom valve monoblock member and monoblock/guide attachment means are used to attach the rod guide member to the top valve monoblock member. Further, the piston tube assembly is operated by means of air pressure in these embodiments.

In some embodiments of the first version of the invention, the bicycle frame is further comprised of a front bicycle frame portion (which may be the front frame member, as described below) and frame connection means, which are used to pivotally connect the rear frame member to the front bicycle frame portion. The frame connection means of these embodiments, which allows a point of the front bicycle frame portion to pivot about a point on the rear frame member, is described in more detail below. Further, in some of these embodiments, the bicycle frame is further comprised of a steering mechanism, which is described in more detail below.

The first version of the invention also generally discloses a second aspect of the bicycle frame comprising a front frame member. In these embodiments of this second aspect of the first version of the invention, the front frame member further comprises frame connection means to pivotally connect the front frame member to a rear bicycle frame portion, which may be the rear frame member described above in some embodiments. The frame connection means of these embodiments, which allows a point of the front frame member to pivot about a point on the rear frame member, is described in more detail below. In these embodiments, the rear frame head portion is the portion of the rear frame member that is located adjacent to the front frame member so that the front frame member pivots about the distal end of the rear frame head portion. In some embodiments of this second aspect of the first version of the invention, the front frame member is comprised of a front frame head portion and two front parallel portions. In these embodiments, the front frame head portion is the portion of the front frame member that is adjacent to the rear frame head portion in embodiments where the front frame head portion is connected to the rear frame member, so that the rear frame member pivots about the front frame head portion. The front parallel portions generally extend forwardly from the front frame head portion, then downwardly, and then rearwardly, circumscribing an arc until the two front parallel portions are extending approximately rearwardly. The two front parallel portions are separated by a distance adequate to permit a front bicycle wheel to be positioned between them. It is to be noted that by use of the term "parallel" to describe the two front parallel portions, it is intended that they may generally mirror one another in shape and need not necessarily be spaced an equal distance apart. In other embodiments of this second aspect of the first version of the invention, the front frame head portion of the front frame member is comprised of a front top plate member, at least two tubular members, a front bottom plate member, and front head attachment means to attach the front top front plate member to one end of each of the at least two tubular members and to attach the front bottom plate member to the other end of each of the at least two tubular members. In some of these embodiments, the front parallel portions extend from the front top plate member. Further, in some embodiments of this second aspect of the first version of the invention, the bicycle frame is further comprised of a steering mechanism, which is described in more detail below.

In some embodiments of this second aspect of the first version of the invention, the front frame head portion and the two front parallel portions are comprised of materials from the group consisting of flexible materials, semi-rigid materials, and combinations of such materials. Thus, in some embodiments the front frame head portion and the two front parallel portions are comprised of titanium, steel, steel alloys, or aluminum. In other embodiments, the front frame head portion and the two front parallel portions are comprised of a wood laminate. In yet other embodiments, the front frame head portion and the two front parallel portions are comprised of a carbon-based composite material. In still other embodiment, the front frame head portion and the two front parallel portions are comprised of carbon fiber, steel, steel alloys, aluminum, titanium, fiberglass, plastic, rubber, or wood or laminates or any combinations of the same. In still other embodiments, the front frame head portion and the two front parallel portions each have a cross section shaped as a circle or an ellipse, or a square, a rectangle, a parallelogram, a trapezoid, or a variation thereof having one or more concave or convex arched surfaces, or any combination of all such shapes.

In other embodiments of this second aspect of the first version of the invention, the front frame member is further comprised of at least two front strut members, as well as top front strut member connector means to connect each top end of the at least two front strut members to the front frame head portion, and bottom rear strut member connector means to connect each bottom end of the at least two front strut members to approximately the rearwardly extending front parallel portions of the front frame member. In some of these embodiments, at least one of the at least two front strut members is located on each side of the front bicycle wheel. In other embodiments, the front frame member further comprises a stabilizing loop member having two ends and loop attachment means to attach each end of the stabilizing loop member to at least one of the at least two front strut members. In some of these embodiments, the at least two front strut members are each comprised of a piston tube assembly and a strut shroud member covering the piston tube assembly. In some of these embodiments, the piston tube assembly is comprised of a piston rod member, a piston tube member, a top valve monoblock member, a bottom valve monoblock member, a bottom strut support member, and a rod guide member. In these embodiments, monoblock/piston tube attachment means are used to attach the top valve monoblock member to one end of the piston tube member and to attach the bottom valve monoblock member to the other end of the piston tube member. In addition, in these embodiments, bottom monoblock/support attachment means are used to attach the bottom strut support member to the bottom valve monoblock member and monoblock/guide attachment means are used to attach the rod guide member to the top valve monoblock member. Further, in these embodiments, the piston tube assembly is operated by means of air pressure.

In some embodiments of this second aspect of the first version of the invention, the front frame member further comprises a front wheel assembly and front wheel assembly attachment means to attach the front wheel assembly to the rearwardly extending portion of the front parallel portions of the front frame member. In some of these embodiments, the front wheel assembly is comprised of at least two front wheel assembly clamp members, a cylindrical front wheel axle member, a front bicycle wheel, front wheel mounting means to rotationally mount the front bicycle wheel on the front wheel axle member, and front wheel axle attachment means to connect the front wheel axle member to the at least two front wheel assembly clamp members. In such embodiments, each of the at least two front wheel assembly clamp members are attached to one of the rearwardly front parallel portions of the front frame member and the front wheel axle member has two ends and extends between the at least two front wheel assembly clamp members. In some of these embodiments, the at least two front wheel clamp members are each comprised of a front wheel assembly outer plate, a front wheel assembly inner plate, and front wheel clamp attachment means to connect the front wheel assembly outer plate to the front wheel assembly inner plate in a manner so that the front parallel portion is held in place by the front wheel assembly inner plate and the front wheel assembly outer plate. In these embodiments, the front wheel assembly outer plate is comprised of a first outer vertical plate portion having a flat surface, a second outer vertical plate portion having a flat surface parallel to the first outer vertical plate portion, and a horizontal outer plate portion extending perpendicular from the flat surface at one end of the first outer vertical plate portion to the flat surface at one end of the second outer vertical plate portion. This creates an approximately U-shaped front wheel assembly outer plate, with the outer horizontal plate portion having a flat interior surface. In these embodiments, the front wheel assembly inner plate is comprised of an inner vertical plate portion having a flat surface and a horizontal inner plate portion extending perpendicular from the flat surface at one end of the first inner vertical plate portion creating an approximately L-shaped member, wherein the exterior surface of the horizontal inner plate portion is flat. When the front wheel assembly inner plate is attached to the front wheel assembly outer plate using the front wheel clamp attachment means, the flat surface of the first outer vertical plate portion is placed adjacent to the flat surface of the inner vertical plate portion and the flat interior surface of the horizontal outer plate portion and the flat exterior surface of the horizontal inner plate portion are placed adjacent to the front parallel portion of the front frame member to which the front wheel clamp member is attached so that the front parallel portion is held in place by the front wheel assembly inner plate and the front wheel assembly outer plate. In some of these embodiments, each front parallel portion of the front frame member has at least two pins and the front wheel assembly clamp member has the same number of holes as the number of such pins and the holes receive the pins to hold the front wheel assembly in place relative to the front parallel portion. In other embodiments, the front wheel assembly clamp member has at least one pin and each front parallel portion of the front frame member has the same number of holes as the number of such at least one pin and the holes receive the at least one pin to hold the front wheel assembly in place relative to the front parallel portion. In still other embodiments, the front wheel assembly further comprises a strip member and means to attach the strip member to the downward frame portion, wherein the strip member and the surface of the front wheel bracket have a pattern of corresponding indentations to hold the front wheel assembly in place relative to the downward frame portion. In some embodiments, the front wheel assembly further comprises at least one disc brake member and disc brake attachment means to attach the at least one disc brake member to one or more of the at least two front wheel assembly clamp members.

In some embodiments of this first version of the invention, the frame attachment means is comprised of a frame attachment tubular member, which is attached to the front frame head portion by upper and lower bolt and spacer means, wherein the frame attachment tubular member is adapted to be disposed within a cylindrical portion positioned at the distal end of the rear frame head portion so that the frame attachment tubular member rotates within the cylindrical portion. In these embodiments, the steering mechanism is comprised of such frame attachment tubular member and upper and lower bolt and spacer means. In some embodiments, the steering mechanism is further comprised of conventional bicycle handlebars that are attached to the frame attachment tubular member using conventional means well known in the relevant art. Other attachment means, such as that used with conventional front bicycle forks, may be used in other embodiments. In some embodiments, the cylindrical portion at the distal end of the rear frame head portion may further comprise a bracket member, wherein the bracket member is attached to the remaining portion of the rear frame head member using front head member bracket attachment means, such as nut, bolt and lock washer combinations, adhesives, epoxies, pins, screws, rivets or similar attachment means or combinations of all such means. In other embodiments, the cylindrical portion may be molded into the rear frame head portion as a part thereof.

In a second version of the invention, the bicycle frame is comprised of a rear frame member, which is further comprised of a rear frame head portion, a downward frame portion, a distal frame portion, a rising frame portion, and a top frame portion. In some embodiments of this second version of the invention, the rear frame head member may be located adjacent to the steering mechanism of the bicycle. The downward frame portion extends generally downwardly in a rearward direction from the rear frame head portion to the position of a crank assembly, which is described in more detail below. The distal frame portion extends in a rearward direction from the position of the crank assembly and is bifurcated into two rear parallel portions rearward of the position of the crank assembly to permit a rear bicycle wheel to fit between them. The two rear parallel portions extend approximately rearwardly from the position of the crank assembly a distance adequate to mount a rear bicycle wheel between the rear parallel portions. It is to be noted that by use of the term "parallel" to describe the two rear parallel portions, it is intended that they may generally mirror one another in shape and need not necessarily be spaced an equal distance apart. The rising frame portion extends from approximately the position of the crank assembly approximately upwardly and forwardly and then approximately upwardly and rearwardly circumscribing an arc until the rising frame portion is extending upwardly and rearwardly to approximately the position of a seat assembly. In some embodiments, the rising frame portion is further comprised of a rising frame member, a lower rising frame bracket member, lower rising member attachment means to attach the lower rising frame bracket member to one end of the rising frame member, an upper rising frame bracket member, and upper rising member attachment means to attach the upper rising frame bracket member to the other end of the rising frame member. The top frame portion generally extends rearwardly from the rear frame head portion to a position rearward of the position of the seat assembly, so that the top frame portion and the rising frame portion join at a point approximately in the position of the seat assembly and form an angle of less than 90 degrees at such point. In various embodiments of the second version of the invention, the rear frame head portion, the downward frame portion, the distal frame portion, the rising frame portion, and the top frame portion may be comprised of the same materials and combinations of materials, and may have the same cross sectional shapes and combinations of shapes, as for portions comprising the rear frame member in the first version of the invention.

In some embodiments of this second version of the invention, the rear frame member further comprises a crank assembly and crank assembly attachment means to attach the crank assembly to the rear frame member at the position of the crank assembly on the downward frame portion of the rear frame member where it meets the distal frame portion. In some of these embodiments, the crank assembly is essentially the same in structure as the crank assembly described above in connection with the first version of the invention, except that lower rising portion connection means are used to connect the rising frame portion to the crank assembly. In embodiments where the rising frame portion is comprised of a lower rising frame bracket, the preferred lower rising portion connection means is a cotter pin used to connect the lower rising frame bracket to the crank assembly. In other embodiments, the crank assembly may be comprised of a plastic or metal casting of similar shape and size laminated or molded into the rear frame member as a part thereof.

In some embodiments of this second version of the invention, the rear frame member further comprises a rear wheel assembly and rear wheel assembly attachment means to attach the rear wheel assembly to the rearwardly extending portion of the rear parallel portions of the distal frame portion of the rear frame member. In some of these embodiments, the rear wheel assembly has the same structure and operation as the rear wheel assembly described above in connection with the first version of the invention, except that in some embodiments the rear wheel assembly is also comprised of bottom rear strut member connector means to connect the bottom end of at least two rear strut members to the rear wheel assembly, as described in more detail below. The preferred bottom rear strut member connector means is a pin or similar connector used to connect the bottom of the rear strut member to the rear wheel clamp assembly. In other embodiments, the rear wheel assembly may be comprised of a similar bracket laminated or molded into the rear frame member as a part thereof.

In some embodiments of this second version of the invention, the rear frame member further comprises a seat assembly and seat assembly attachment means to attach the seat assembly to the rear frame member at the position of the seat assembly on the rearward portion of the top frame portion of the rear frame member. In some of these embodiments, the seat assembly has the same structure and operation as the seat assembly described above in connection with the first version of the invention, except that upper rising portion connection means are used to connect the rising frame portion to the seat assembly. In embodiments where the rising frame portion is comprised of an upper rising frame bracket, the preferred upper rising portion connection means is a cotter pin used to connect the upper rising frame bracket to the seat assembly. In other embodiments, the seat assembly may be comprised of a similar bracket molded into the rear frame member as a part thereof.

In other embodiments of this second version of the invention, the rear frame member is further comprised of at least two rear strut members, as well as top rear strut member connector means to connect each top end of the at least two rear strut members to the seat assembly (as described in more detail below), and bottom rear strut member connector means to connect each bottom end of the at least two rear strut members to approximately the rearwardly extending rear parallel portions of the distal frame portion of the rear frame member in some embodiments, and to the rear wheel assembly in other embodiments. In some of these embodiments, at least one of the at least two rear strut members is located on each side of the rear bicycle wheel. In other embodiments, the rear frame member further comprises a stabilizing loop member having two ends and loop attachment means to attach each end of the stabilizing loop member to at least one of the at least two rear strut members. In some of these embodiments, the at least two rear strut members are each comprised of a piston tube assembly and a strut shroud member covering the piston tube assembly. In some of these embodiments, the piston tube assembly is constructed and operated substantially the same as for the piston tube assemblies described above in relation to the first version of the invention.

In some embodiments of this second version of the invention, the bicycle frame is further comprised of a front bicycle frame portion (which may be the front frame member, as described below) and frame connection means, which are used to pivotally connect the rear frame member to the front bicycle frame portion. The frame connection means of these embodiments, which allows a point of the front bicycle frame portion to pivot about a point on the rear frame member, may have substantially the same structure, features and operation as described above in connection with the first version of the invention. Further, in some of these embodiments, the bicycle frame is further comprised of a steering mechanism, which may have substantially the same structure, features and operation as described above in connection with the first version of the invention. In other embodiments of this second version of the invention, the bicycle frame is further comprised of a front frame member and frame connection means to pivotally connect the rear frame member to the front frame member. In these embodiments, the front frame member and the frame connection means of the second version of the invention have substantially the same structure, features and operation as the front frame member and the frame connection means described above in connection with the first version of the invention.

The bicycle frame of the present invention therefore meets the needs described above in the Background section. For example, it provides a flexible frame having a unique and unusual appearance that is aesthetically pleasing. In addition, the modularized assemblies are interchangeable in some embodiments, making manufacture easier, and therefore less expensive. Further, the modular assemblies may be easily removed from the flexible frame members in some embodiments, making repair and replacement of the modular assemblies easier and less expensive, and also providing a way to easily disassemble the bicycle for compact transportation or storage.

There has thus been outlined, rather broadly, the more primary features of the present invention. There are additional features that are also included in the various embodiments of the invention that are described hereinafter and that form the subject matter of the claims appended hereto. In this respect, it is to be understood that the invention is not limited in its application to the details of construction and to the arrangements of the components set forth in the following description or illustrated in the following drawings. This invention may be embodied in the form illustrated in the accompanying drawings, but the drawings are illustrative only and changes may be made in the specific construction illustrated and described within the scope of the appended claims. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

The foregoing summary, as well as the following description, will be better understood when read in conjunction with the appended drawings, in which.

DETAILED DESCRIPTION

Reference will now be made in detail to the preferred aspects, versions and embodiments of the present invention, examples of which are illustrated in the accompanying drawings. While the invention will be described in conjunction with the preferred aspects, versions and embodiments, it is to be noted that the aspects, versions and embodiments are not intended to limit the invention to those aspects, versions and embodiments. On the contrary, the invention is intended to cover alternatives, modifications and equivalents, which may be included within the spirit and scope of the invention as defined by the appended claims.

Figure 1A:
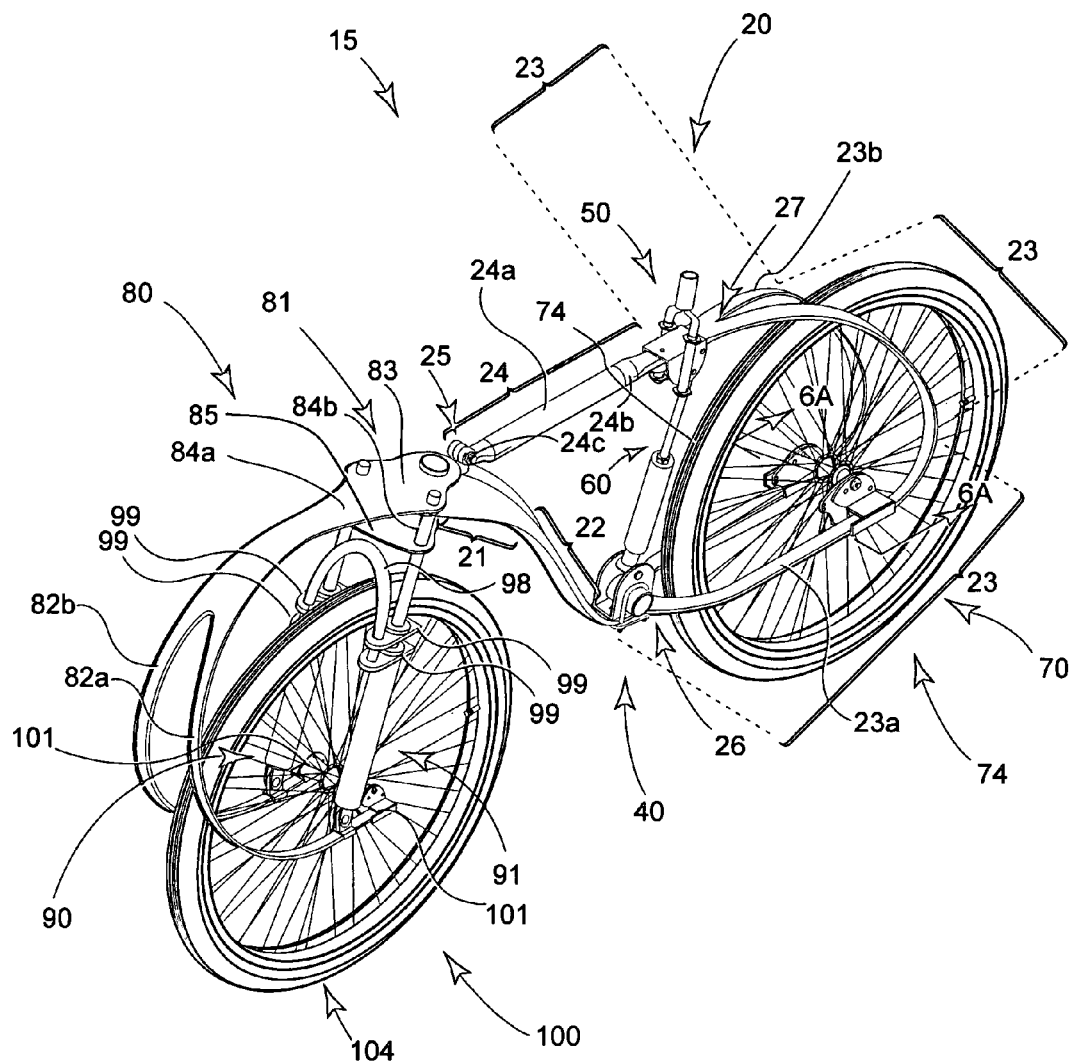
FIG. 1A is a perspective view of a first embodiment of a first version (a bicycle) of the invention, as viewed from the side of and above the bicycle.
Figure 1B:
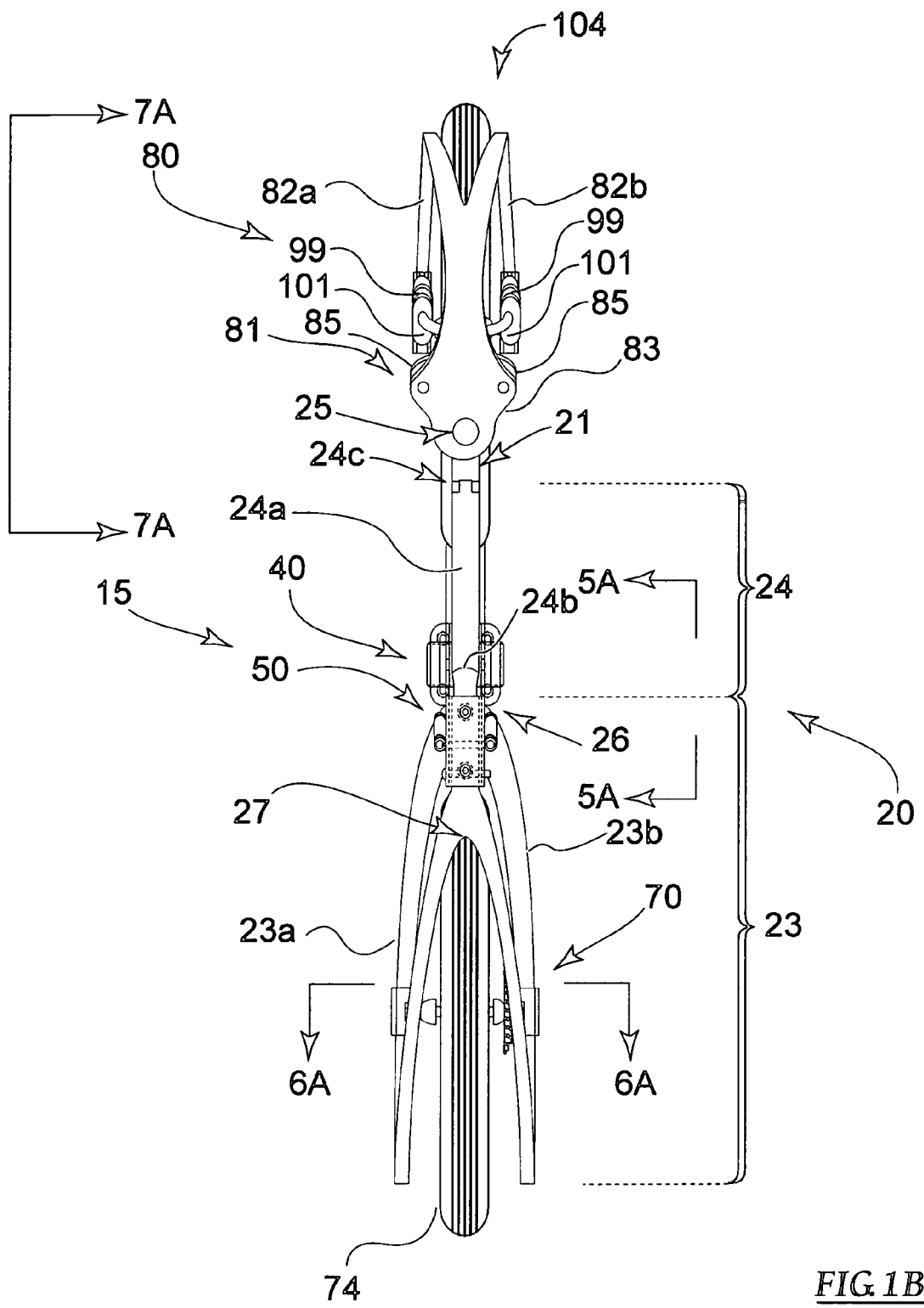
FIG. 1B is a plan view of the embodiment of the invention illustrated in FIG. 1A from above the bicycle.

One embodiment of a first version of the present invention is illustrated in FIG. 1A and FIG. 1B. In various embodiments of this first version, a first aspect of the invention is a bicycle 15 comprised of a rear frame member 20, which is further comprised of a rear frame head portion 21, a downward frame portion 22, a distal frame portion 23, and a top frame portion 24. In some embodiments of this first version of the invention, the rear frame head portion 21 may be located adjacent to the steering mechanism 25 of the bicycle 15. The downward frame portion 22 extends generally downwardly in a rearward direction from the rear frame head portion 21 to the position of a crank assembly 40, which is described in more detail below. Although the crank assembly 40 is a part of the invention in the embodiment of the invention illustrated in FIG. 1A and FIG. 1B, the crank assembly 40 is not necessarily a part of the invention in all embodiments. The distal frame portion 23 extends in an approximately rearward direction from the position of the crank assembly 40 and is bifurcated at point 26 into two rear parallel portions 23*a* and 23*b* rearward of the position of the crank assembly 40 to permit a rear bicycle wheel 74 to fit between them. It is to be noted that by use of the term "parallel" to describe the two rear parallel portions 23*a* and 23*b*, it is intended that they may generally mirror one another in shape and need not necessarily be spaced an equal distance apart. The distance the two rear parallel portions 23*a* and 23*b* are split apart is dependent upon the width of a rear wheel assembly 70 (on which is mounted the rear bicycle wheel 74) that may be used with the rear frame member 20 in various embodiments of the invention, as described in more detail below. The two rear parallel portions 23*a*, 23*b* extend approximately rearwardly from the position of the crank assembly 40, then approximately upwardly, and then approximately forwardly, where they are joined together at point 27 into a single portion, which extends approximately forwardly to the position of a seat assembly 50, which is described in more detail below. Although the seat assembly 50 is a part of the invention in the embodiment of the invention illustrated in FIG. 1A and FIG. 1B, the seat assembly 50 is not necessarily a part of the invention in all embodiments. In the embodiment of this first version of the invention illustrated in FIG. 1A and FIG. 1B, the distal frame portion 23 generally circumscribes an arc. Although the arc illustrated in the embodiment of FIG. 1A and FIG. 1B has a shape that includes a combination of curvatures, in other embodiments the arc may be comprised of different types of curvatures (such as circular, elliptical or parabolic shapes) or combinations of curvatures (such as approximately elliptical on the lower portion of the rear parallel portions and approximately circular on the top portion of the rear parallel portions. The top frame portion 24 generally extends forwardly from the position of the seat assembly 50 to the rear frame head portion 21. In some embodiments of this first version of the invention, as illustrated in FIG. 1A and FIG. 1B, the top frame portion 24 may be comprised of a top frame member 24*a* having a circular-shaped or inverted U-shaped cross section that is joined at one end to the distal frame portion 23 approximately forward of the position of the seat assembly 50 by means of a weld 24*b*. In other embodiments of this first version of the invention, the top frame member 24*a* may be joined to the distal frame portion 23 by using adhesives, rivets, screws, pins, a hinge, a shock absorber, or any combination of such means. In other embodiments, the distal frame portion 23 and the top frame portion 24 may be one continuous piece varying in thickness and contour. In some embodiments of this first version of the invention, as illustrated in FIG. 1A and FIG. 1B, the top frame portion 24 may be comprised of a top frame member 24*a* that is joined at the other end to the rear frame head portion 21 by means of a shock absorbing hinge 24*c* secured with a threaded pin. In other embodiments of this first version of the invention, the top frame member 24*a* may be joined to the rear frame head portion 21 by means of molding or laminating the top frame member 24*a* into the rear frame head portion 21, forming one piece. It is to be noted that use of "forwardly," "rearwardly," "upwardly," "downwardly" and other similar terms used herein are intended to be approximate. For example, as illustrated in FIG. 1A and FIG. 1B, the two rear parallel portions 23*a* and 23*b* extending "rearwardly" and "upwardly" also extend in a somewhat lateral direction relative to the longitudinal axis of the bicycle 15.

Figure 2A:
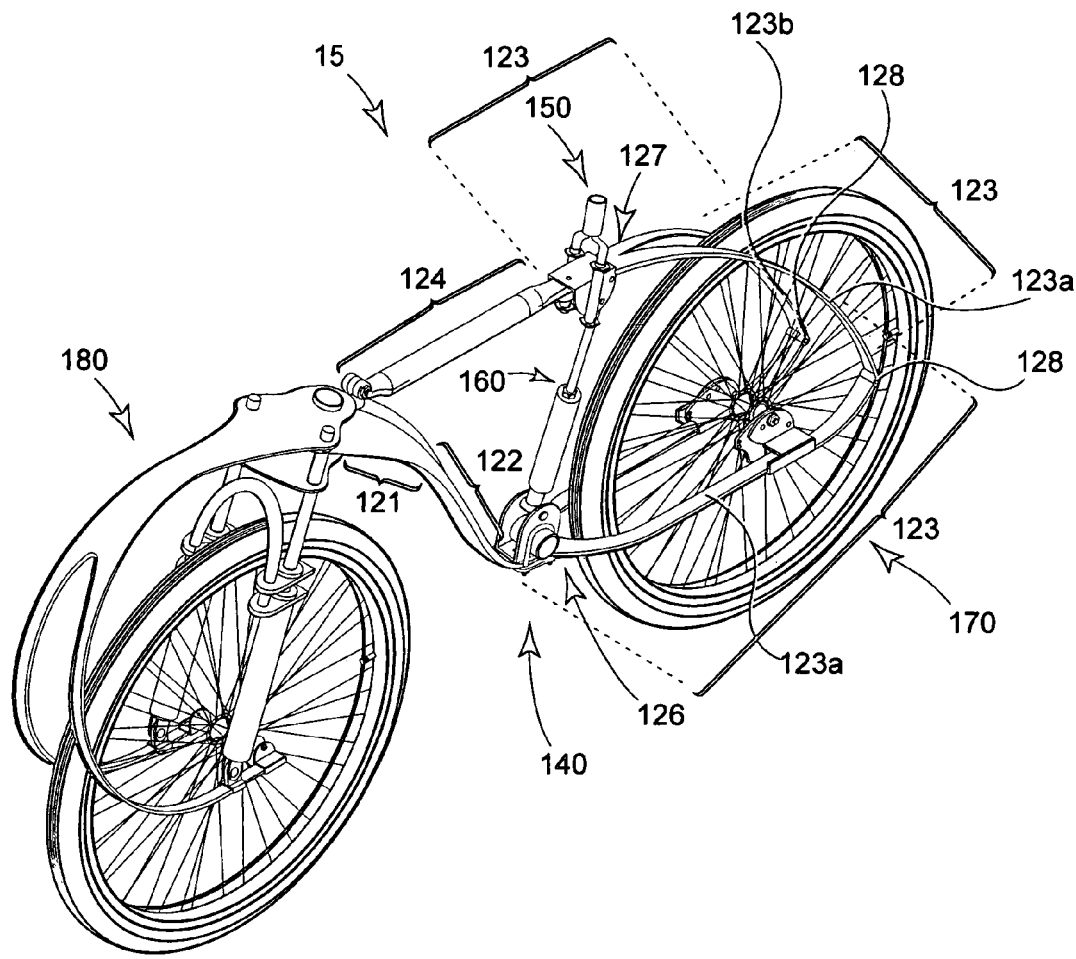
FIG. 2A is a perspective view of a second embodiment of the first version (a bicycle) of the invention, as viewed from the side of and above the bicycle.
Figure 2B:
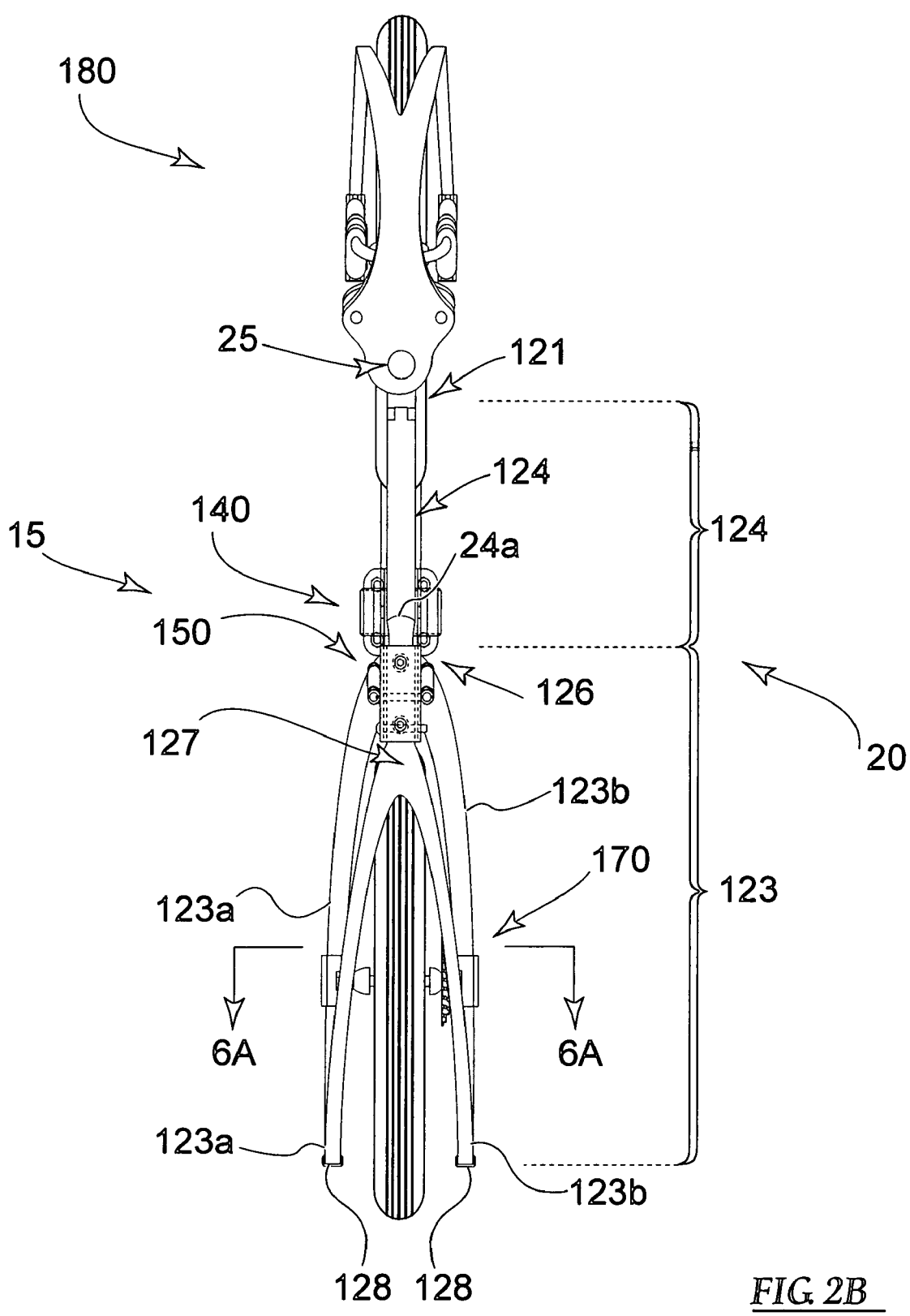
FIG. 2B is a plan view of the embodiment of the invention illustrated in FIG. 2A from above the bicycle.

It is to be noted that in other embodiments of this first version of the invention the distal frame portion 23 may have other shapes. For example, in the embodiment of the invention illustrated in FIG. 2A and FIG. 2B, the distal frame portion 123 extends rearwardly from the position of the crank assembly 140 to the point 126 where the distal frame portion 123 bifurcates into the two parallel rear portions 123*a* and 123*b*. It is to be noted that by use of the term "parallel" to describe the two rear parallel portions 123*a* and 123*b*, it is intended that they may generally mirror one another in shape and need not necessarily be spaced an equal distance apart. The distance the two rear parallel portions 123*a* and 123*b* are split apart is dependent upon the width of a rear wheel assembly 170 that may be used with the distal frame portion 123 in various embodiments of the invention, as described in more detail below. From that point 126, the two rear parallel portions 123*a* and 123*b* extend approximately rearwardly and upwardly to a point 128, from which point 128 the two rear parallel portions 123*a* and 123*b* extend approximately upwardly and forwardly to the point 127 where they are joined into a single portion rearward of the seat assembly 150. In the illustrated embodiment, the portions of the distal frame portion 123 emanating from point 128 generally form an angle of less than 90 degrees at such point 128. It is to be noted that in other embodiments of this first version of the invention, the distal frame portion 123 may be of other shapes as well. In the embodiment of the invention illustrated in FIG. 2A and FIG. 2B, the upper and lower portions of the two parallel portions 123*a* and 123*b* are joined together at point 128 by means of a hinge secured with a threaded pin. In other embodiments of this first version of the invention, the upper and lower portions of the two parallel portions 123*a* and 123*b* may be joined together at point 128 by means of molding or laminating the two parallel portion 123*a* and 123*b* together, so that they form a single piece. In other embodiments, the two parallel portion 123*a* and 123*b* may be joined together by means of welding, adhesives, or epoxies or any combination thereof. In the embodiment of the invention illustrated in FIG. 2A and FIG. 2B, the rear frame head portion 121, the downward frame portion 122, and the top frame portion 124 have substantially the same characteristics as the rear frame head portion 21, the downward frame portion 22, and the top frame portion 24, respectively, in the embodiment of the invention illustrated in, and herein described in connection with, FIG. 1A and FIG. 1B. It is also to be noted that to the extent the embodiment of the first version of the invention illustrated in FIG. 2A and FIG. 2B is further comprised of a crank assembly 140, a seat assembly 150, a rear strut member 160, rear wheel assembly 170, or front frame member 180, or any combination of such assemblies or members, such assemblies and members have substantially the same characteristics as the crank assembly 40, the seat assembly 50, the rear strut member 60, the rear wheel assembly 70, and the front frame member 80, respectively, in the embodiment of the invention illustrated in, and herein described in connection with, FIG. 1A and FIG. 1B.

Figure 1C:
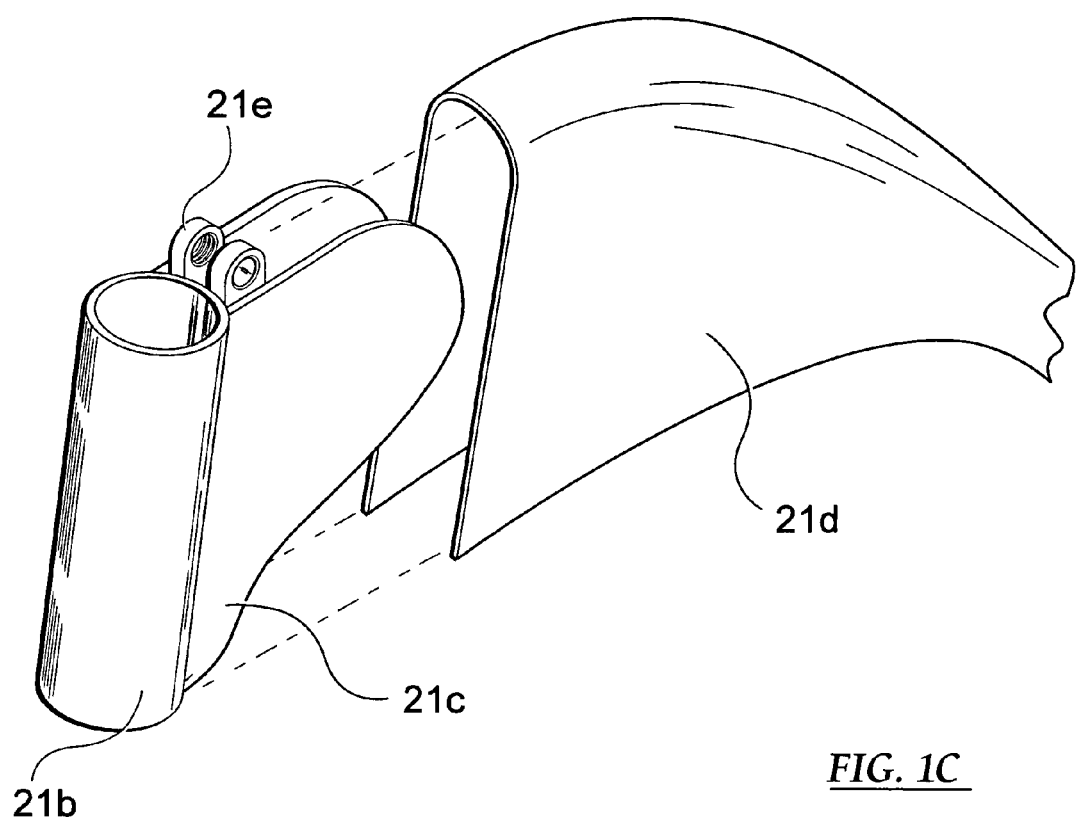
FIG. 1C is an enlarged perspective view of an embodiment of the rear frame head portion, as viewed from the side of and above the rear frame head portion as it is oriented on the bicycle.

In the embodiment of the invention illustrated in FIG. 1A and FIG. 1B, the rear frame head portion 21 is constructed of a single piece. In other embodiments of this first version of the invention, the rear frame head portion 21 may be constructed of more than one piece. For example, as illustrated in FIG. 1C, the front frame head portion 21 may be comprised of a cylindrical portion 21*b*, a bracket portion 21*c*, and a generally U-shaped frame portion 21*d*. In this embodiment, the cylindrical portion 21*b* and the bracket portion 21*c* are constructed of steel, steel alloy, aluminum or titanium and are welded together. In other embodiments, the cylindrical portion 21*b* and the bracket portion 21*c* may be constructed of other materials, such as the materials comprising the various portions of the rear frame member 20, and may be attached using any appropriate means, such as adhesives, epoxies, and other means currently known in the art or the may be developed in the art in the future. Alternatively, the cylindrical portion 21*b* and the bracket portion 21*c* may be fabricated as a single piece. In this embodiment, the U-shaped frame portion 21*d* may be constructed of the same materials and have the same features as the rear frame head portion 21 described herein in connection with FIG. 1A and FIG. 1B. In this embodiment, the U-shaped frame portion 21*d* may be attached to the bracket portion 21*b* using adhesives, epoxies, pins, screws, rivets, quick release fasteners, nut, bolt and lock washer combinations, and other fasteners and combinations of all such fastening means currently known in the art or developed in the art in the future. In this embodiment, the front frame head member 21 further comprises a shock absorbing hinge 21*e*, which may be the same as the shock absorbing hinge 24*c* of the embodiment illustrated in FIG. 1A and FIG. 1B, and which may be used to connect the front frame head member 21 to the top frame member 24*a* (see FIG. 1A) in various embodiments. In these embodiments, the top frame member 24*a* may be connected to the shock absorbing hinge 21*e* by means of pin and cotter pin combinations, quick release fasteners, nut, bolt and lock washer combinations, and other fasteners and combinations of all such fastening means currently known in the art or developed in the art in the future.

In some embodiments of this first version of the invention, as illustrated in FIG. 1A and FIG. 1B, the rear frame head portion 21, the downward frame portion 22, the distal frame portion 23, and the top frame portion 24 are comprised of materials from the group consisting of flexible materials, semi-rigid materials, and combinations of such materials. It is to be noted, however, that such materials may provide for flexure in one or more directions, but may provide a degree of rigidity in other directions. For example, various portions of the rear frame member 20 may be constructed of titanium, steel, steel alloys, or aluminum. In these embodiments, the titanium, steel, steel alloys, or aluminum may be oriented so that a relatively high degree of flexure is provided in the vertical direction (when viewing the rear frame member 20 from the perspective of a standing bicycle 15), but a relatively low degree of flexure is provided in the horizontal direction. Thus, a rear frame head portion 21, a downward frame portion 22, a distal frame portion 23, and a top frame portion 24 comprised of titanium, steel or aluminum would allow the rear frame member 20 to flex up and down, but not to the sides. Generally, the widths and thicknesses of the various portions of the rear frame member 20 are dependent upon the size of the rear frame member 20, its anticipated use, and the characteristics of the materials used to construct the rear frame member 20. In the embodiment of the invention illustrated in FIG. 1A and FIG. 1B, the width of the rear frame head portion 21 depends upon the material used to construct the rear frame head portion 21. Such width is great enough to provide adequate support for the weight to be supported by the rear frame member 20, but small enough to retain the desired degree of flexibility of the rear frame member 20. More preferred, the rear frame head portion 21 has a width that varies from ¾ inches to 2 inches, as viewed from above the rear frame member 20 (as illustrated in FIG. 1B). The length of the rear frame head portion 21 adjacent to the steering mechanism 25 is dependent upon a number of factors, such as the anticipated use and size of the bicycle 15. It is preferred, however, that such length be between 10 inches and 14 inches. It is to be noted, however, that all or part of the portion of the rear frame head portion 21 adjacent to the bicycle steering mechanism 25 may be constructed entirely of a rigid material (such as titanium, steel, steel alloy, or aluminum) to withstand the forces associated with steering the bicycle 15. In the embodiment of the invention illustrated in FIG. 1A and FIG. 1B, the widths and thicknesses of the downward frame portion 22, the distal frame portion 23 (except the rear parallel portions 23*a* and 23*b*), and the top frame portion 24 depend upon the material used to construct the downward frame portion 22, the distal frame portion 23 (except the rear parallel portions 23*a* and 23*b*), and the top frame portion 24, respectively. Such widths and thicknesses are great enough to provide adequate support for the weight to be supported by the rear frame member 20, but small enough to retain the desired degree of flexibility of the rear frame member 20. More preferred, the downward frame portion 22, the distal frame portion 23 (except the rear parallel portions 23*a* and 23*b*), and the top frame portion 24 have a width that varies from ¾ inches to 2 inches, as viewed from above the rear frame member 20 (as illustrated in FIG. 1B), and a thickness that varies from ⅛ inches to ½ inches. In the embodiment of the invention illustrated in FIG. 1A and FIG. 1B, the widths and thicknesses of the rear parallel portions 23*a* and 23*b* are approximately the same and depend upon the material used to construct the rear parallel portions 23*a* and 23*b*. Such widths and thicknesses are great enough to provide adequate support for the weight to be supported by the rear frame member 20, but small enough to retain the desired degree of flexibility of the rear frame member 20. Most preferred, the rear parallel portions 23*a* and 23*b* have a width that varies from ⅜ inches to 1 inch, as viewed from above the rear frame member 20 (as illustrated in FIG. 1B). In the embodiment of the invention illustrated in FIG. 1A and FIG. 1B, the rear frame head portion 21, the downward frame portion 22, the distal frame portion 23, and the top frame portion 24 may be constructed in whole or in part of any materials currently known in the art or that may be developed in the art in the future that provide an adequate level of support for the anticipated load to be borne by the rear frame member 20, while still maintaining the flexible nature of the rear frame member 20. Examples include carbon fiber composites, steel, steel alloys, aluminum, titanium, other metals, fiberglass, plastics, rubber, or wood or laminates or any combinations of the same. Examples of suitable wood laminates include layers of oak, ebony, lignum vitae, and teak or combinations of the same, which are inter-layered with adhesive materials suitable to permanently bind the wood layers of the laminate together. It is also to be noted that the above materials may also be laminated with one another in various embodiments. For example, portions of the rear frame member may be comprised of laminates of carbon fiber and titanium, carbon fiber and fiberglass, or carbon fiber and wood. It is also to be noted that the various portions of the rear frame member 20 may be constructed of combinations of materials in different embodiments of the invention. For example, the downward frame portion 22 may be constructed of titanium and the distal end portion 23 may be constructed of a carbon fiber composite and wood laminate. It is preferred, however, that all portions of the rear frame member 20 be constructed of the same material for ease in manufacturing the rear frame member 20. In the embodiment of the invention illustrated in FIG. 1A and FIG. 1B, the downward frame portion 22, the distal frame portion 23, and a portion of the top frame portion 24 each have a cross-section shaped as a rectangle, while the remaining portion of the top frame portion 24 has a circular-shaped or inverted U-shaped cross section. In other embodiments of this first version of the invention, however, the cross-section of the downward frame portion 22, the distal frame portion 23, and the top frame portion 24 may be of almost any shape desired by the user of the rear frame member 20. For example, the downward frame portion 22, the distal frame portion 23, and the top frame portion 24 may be of other shapes, such as a circle or an ellipse, or a parallelogram, a trapezoid, a square, a rectangle, or any combination thereof having one or more concave or convex arched surfaces, or any combination of all such shapes. The preferred cross-sectional shape of the various portions of the rear frame member 20 is dependent upon the taste of the user of the rear frame member 20 and the materials used to construct the various portions of the rear frame member 20. The more preferred shapes are rectangular, rectangular with an arched surface, U-shaped, square or a combination of one or more of such shapes.

Figure 3A:
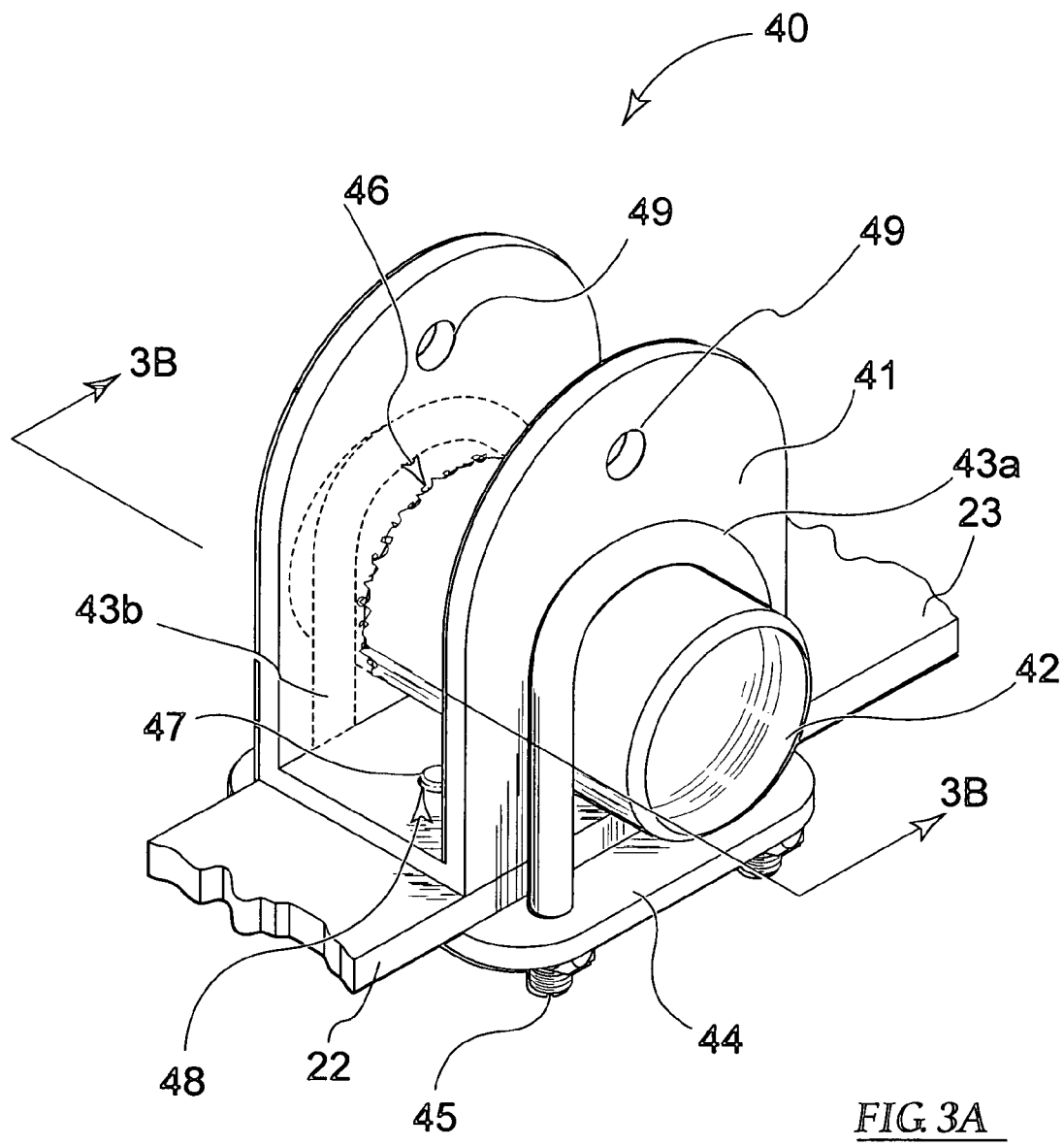
FIG. 3A is a perspective view of an embodiment of the crank assembly of the embodiment of the invention illustrated in FIG. 1A and FIG. 1B, as viewed from the side of and above the crank assembly, which also illustrates an embodiment of the crank assembly attachment means used to attach the crank assembly to the rear frame member.
Figure 3B:
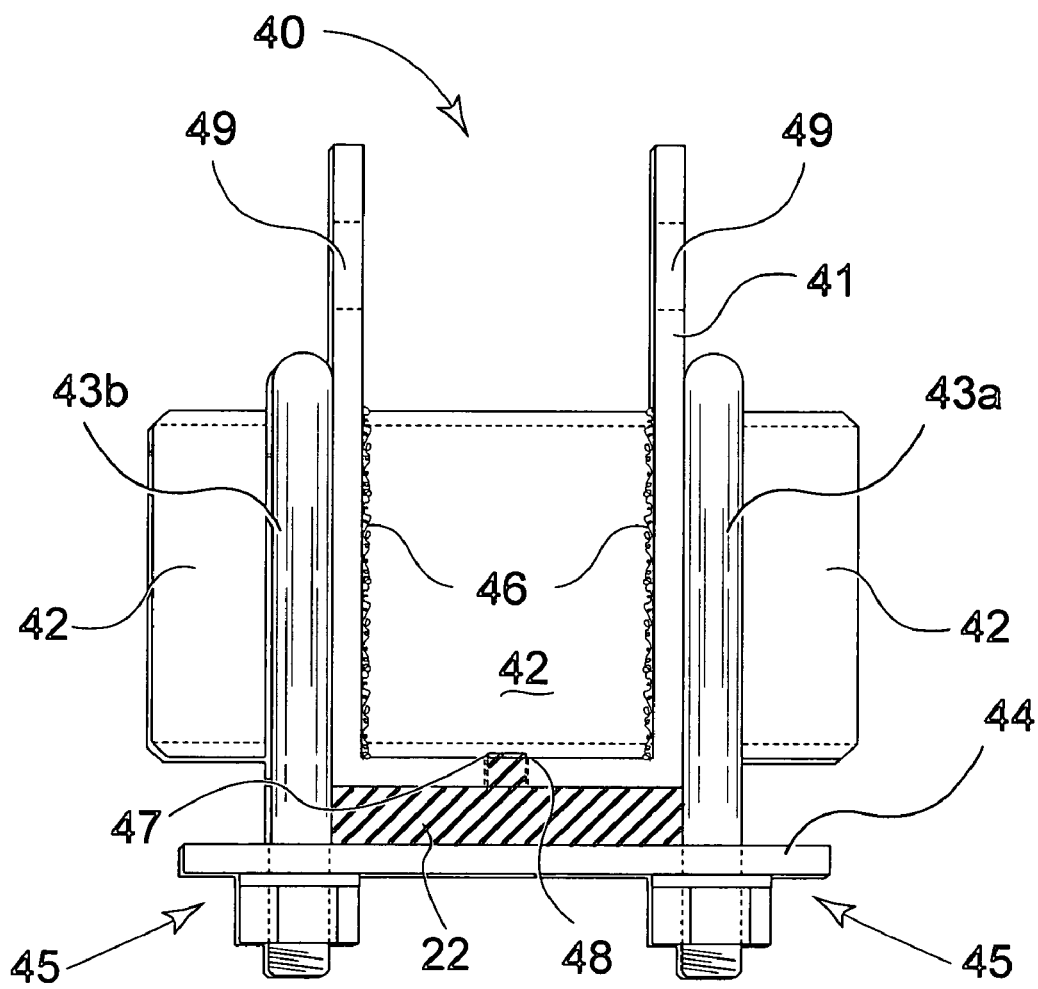
FIG. 3B is an elevation view of the embodiment of the crank assembly illustrated in FIG. 3A, as viewed along the lines 3B-3B in FIG. 3A.

In the embodiment of this first version of the invention illustrated in FIG. 1A and FIG. 1B, the rear frame member 20 further comprises a crank assembly 40 and crank assembly attachment means, described in more detail below, to attach the crank assembly 40 to the downward frame portion 22 of the rear frame member 20. One embodiment of the crank assembly 40 is illustrated in FIG. 3A and FIG. 3B, in which the crank assembly 40 is comprised of a top crank bracket 41 approximating a U-shape, a cylindrical tubular member 42, at least two bail members 43a and 43b, at least one bottom plate 44, and lock washers and nuts 45 connected to the bail members 43a and 43b as bail attachment means to attach the two bail members 43a and 43b to the bottom plate 44. It is to be noted that the crank assembly 40 may have a different form or geometry in other embodiments of the invention. In the embodiment of the crank assembly 40 illustrated in FIG. 3A and FIG. 3B, the tubular member 42 and the top crank bracket 41 are constructed of steel or aluminum, and the crank tube attachment means, which is used to connect the tubular member 42 to the top crank bracket 41, is a weld 46 that extends along all or a portion of the perimeter of the tubular member 42 where it meets the top crank bracket 41. In other embodiments, the top crank bracket 41 and the tubular member 42 may be comprised of other rigid materials of sufficient strength and resiliency, such as plastics, carbon-based composites, titanium, other metals, and combinations thereof, which are currently known in the art or may be developed in the art in the future. In yet other embodiments, the crank tube attachment means used to attach the tubular member 42 and the top crank bracket 41 may be adhesives, epoxies, and similar means and combinations thereof, which are currently known in the art or may be developed in the art in the future. In still other embodiments, the tubular member 42 and the top crank bracket 41 (or another member performing the same function) may be fabricated as a single piece. In the embodiment illustrated in FIG. 3A and FIG. 3B, the crank assembly attachment means, which is used to attach the crank assembly 40 to the downward frame portion 22 of the rear frame member 20, is comprised of the two bail members 43a and 43b having threaded ends, which are placed over the tubular member 42 and secured to the bottom plate 44 by the lock washers and nuts 45 (bail attachment means) in a manner so that the downward frame portion 22 is held between the top crank bracket 41 and the bottom plate 44. The two bail members 43a and 43b and the bottom plate 44 may generally be constructed of the same type of materials as the top crank bracket 41 and the tubular member 42, or any other materials or combinations of materials having sufficient strength and rigidity. There may also be more than two bail members 43a and 43b in other embodiments. It is to be noted, however, that in other embodiments the two bail members 43a and 43b may be secured to the bottom plate 44 using other means. For example, rather than using lock washers and nuts 45, the bail members 43a and 43b may be secured by welding them to the bottom plate 44 or by means of an adhesive material, such as epoxy or its equivalents. It is also to be noted that in other embodiments the crank assembly attachment means may be almost any suitable means to attach the crank assembly 40 to the downward frame portion 22. For example, instead of using the two bail members 43a and 43b and the bottom plate 44, the top crank bracket 41 and the downward frame portion 22 may have one or more corresponding holes drilled therein, and bolts, nuts and lock washers may be positioned in the holes to secure the top crank bracket 41 to the downward frame portion 22. In still other embodiments, the crank assembly 40 may be laminated or molded as a part of the rear frame member 20. In some embodiments of this first version of the invention, as illustrated in FIG. 3A and FIG. 3B, the downward frame portion 22 has two pins 47 and the top crank bracket 41 has the same number of holes 48 as the number of such pins 47 and the holes 48 receive the pins 47 to hold the crank assembly 40 in place relative to the downward frame portion 22. Although two pins 47 are the preferred number, more or fewer pins may be used in other embodiments. In other embodiments, the top crank bracket 41 may have at least one pin and the downward frame portion 22 has the same number of holes as the number of such pins and the holes receive the at least one pin to hold the crank assembly 40 in place relative to the downward frame portion 22. In still other embodiments, the bottom plate 44 may have at least one pin and the downward frame portion 22 has the same number of holes as the number of such pins and the holes receive the at least one pin to hold the crank assembly 40 in place relative to the downward frame portion 22. In still other embodiments, a strip member is attached to the downward frame portion 22, and the strip member and the surface of the top crank bracket 41 that faces the downward frame portion 22 both have a pattern of corresponding indentations, so that when the top crank bracket 41 is forced down against the strip member attached to the downward frame portion 22, the crank assembly 40 is held in place relative to the downward frame portion 22. In these embodiments, the strip member may be constructed of a metal foil and may be attached to the downward frame portion 22 by an adhesive material. In the embodiment of the crank assembly 40 illustrated in FIG. 3A and FIG. 3B, the top crank bracket 41 also has holes 49 that are used to mount a rear strut member 60 (see FIG. 1A). The crank assembly 40, and the tubular member 42 in particular, are generally adapted to receive a standard form of bicycle pedal assembly that is well known in the art. The pedal assembly is typically comprised of a shaft (that may include rotational bearings or other lubricating members), to which is attached a chain drive sprocket member and two opposing perpendicular arm members, to each of which is attached a pedal member.

Figure 4A:
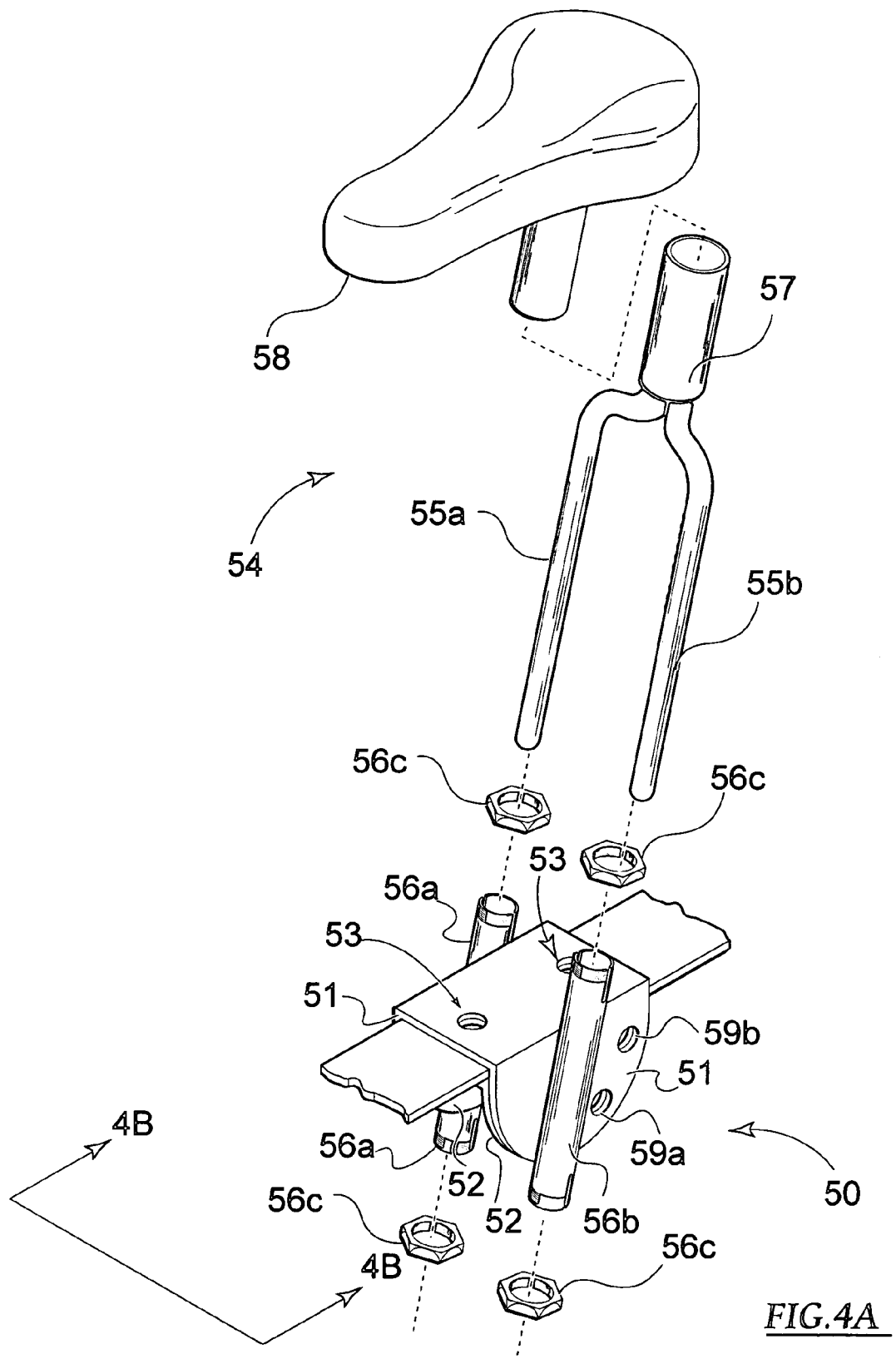
FIG. 4A is a perspective view of an embodiment of the seat assembly of the embodiment of the invention illustrated in FIG. 1A and FIG. 1B, as viewed from the side of and above such seat assembly, which also illustrates an embodiment of the seat assembly attachment means used to attach the seat assembly to the rear frame member and an embodiment of the seat member and the seat member attachment means used to attach the seat member of the seat assembly to the outer bracket of the seat assembly.
Figure 4B:
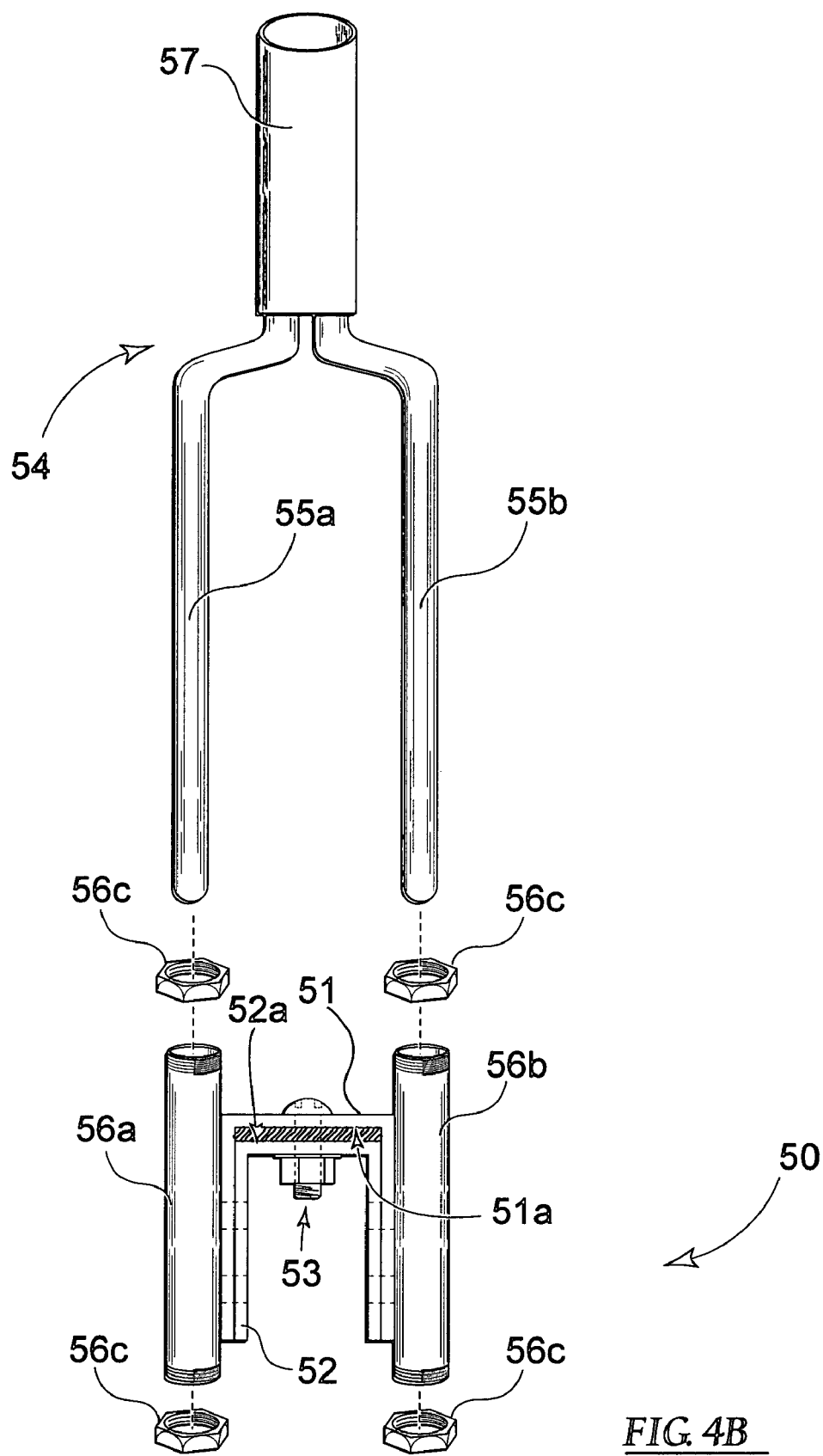
FIG. 4B is an elevation view of the embodiment of the seat assembly illustrated in FIG. 4A, as viewed from a position forward of the seat assembly along the lines 4B-4B in FIG. 4A.

In the embodiment of this first version of the invention illustrated in FIG. 1A and FIG. 1B, the rear frame member 20 further comprises a seat assembly 50 and seat assembly attachment means, described in more detail below, to attach the seat assembly 50 to the forwardly extending portion of the distal frame portion 23 of the rear frame member 20. One embodiment of the seat assembly 50 and seat assembly attachment means is illustrated in FIG. 4A and FIG. 4B. In this embodiment, the seat assembly 50 is comprised of an approximately U-shaped outer bracket member 51, an approximately U-shaped inner bracket member 52, bolts, nuts and lock washers 53 as seat bracket connecting means to connect the outer bracket member 51 to the inner bracket member 52, a seat member 54, and seat member attachment means (which are described in more detail below) to attach the seat member 54 to the outer bracket member 51. In this embodiment, the internal horizontal surface 51a of the outer bracket member 51 is placed adjacent to the top surface of the distal frame portion 23, the external horizontal surface 52a of the inner bracket member 52 is placed adjacent to the bottom surface of the distal frame portion 23. Also in this embodiment, the bolts, nuts and lock washers 53 acting as both seat bracket connecting means and seat assembly attachment means, connect the outer bracket member 51 to the inner bracket member 52 in a manner so that the portion of the distal frame portion 23 to which the seat assembly 50 is attached is held in place between the outer bracket member 51 and the inner bracket member 52. Although the outer bracket member 51 and the inner bracket member 52 are generally semi-circular in shape (as viewed from the side) in this embodiment, they may both be of other shapes in other embodiments. For example, the outer bracket member 51 and the inner bracket member 52 may be rectangular, elliptical, triangular, or have another shape or combination of shapes depending upon the taste of the user of the bicycle 15. It is also to be noted that in other embodiments of this first version of the invention, the seat bracket connecting means and seat assembly attachment means may be comprised of almost any means known in the art to join mechanical components together. For example, in other embodiments the seat bracket connecting means and seat assembly attachment means may be comprised of one or more screws (with threaded taps in the distal frame portion 23 or either the outer bracket member 51 or inner bracket member 52), rivets, adhesives (such as epoxy), or any combination of such means. In yet other embodiments, the outer bracket member 51, the inner bracket member 52, and the seat member 54, or any combination thereof or equivalent structures performing the same function, may be fabricated as a single piece or more than one piece. In this embodiment, the outer bracket member 51 or inner bracket member 52 are constructed of steel or aluminum, but in other embodiments other rigid materials of adequate strength, such as plastics, titanium, steel alloys, and combinations of such materials, may also be used.

In the embodiment of the seat assembly illustrated in FIG. 4A and FIG. 4B, the seat member attachment means is comprised of two seat rods 55a and 55b, which are inserted into two seat rod tubes 56a and 56b that are threaded at each end. In this embodiment, nuts 56c with tapered threads are screwed onto the seat rod tubes 56a and 56b, clamping the seat rod tubes 56a and 56b against the seat rods 55a and 55b, holding them in place. In this embodiment, the seat rod tubes 56a and 56b are constructed of titanium, steel, steel alloys, or aluminum and are welded to the outer bracket member 51. In other embodiments, different means may be used to attach the seat rod tubes 56a and 56b to the outer bracket member 51. For example, the seat rod tubes 56a and 56b may be attached to the outer bracket member 51 by using an adhesive (such as epoxy) or any type of mechanical fastener system, such as brackets placed over the seat rod tubes 56a and 56b and affixed to the outer bracket member 51 by means of screws, pins, rivets, nuts, bolts, and combinations of such means. In yet other embodiments, the seat rod tubes 56a and 56b and the outer bracket member 51, or any equivalent structures performing the same function, may be fabricated as a single piece. Similarly, the seat rod tubes 56a and 56a and the seat rods 55a and 55b have a cylindrical cross section in this embodiment, but may have other cross-sectional shapes (such as square, triangular, hexagonal) in other embodiments. Further, although the preferred number of seat rod tubes 56a, 56b is two, there may be only one seat rod tube, or more than two seat rod tubes 56a and 56b, in other embodiments of the invention. In the embodiment illustrated in FIG. 4A and FIG. 4B, the seat rods 55a and 55b are joined to a seat head member 57, which is joined to a seat 58 upon which the rider sits while operating the bicycle 15. It is to be noted that in other embodiments of this first version of the invention, the seat head member 57 and the seat 58 may utilize almost any geometry and means of connecting the seat head member 57 to the seat 58, which are currently known in the art or that may be developed in the art in the future. Such means, which are well known, are dependent upon the type of seat 58 to be utilized and the individual taste of the operator of the bicycle 15. In the embodiment of the seat assembly illustrated in FIG. 4A and FIG. 4B, the seat assembly 50 also has one or more rear strut connecting ports 59a, 59b located on a portion of the vertical surfaces of the outer bracket member 51 and the inner bracket member 52. The strut connecting ports 59a, 59b are used to connect one end of the at least one rear strut member 60 to the seat assembly 50, as described in more detail below.

Figure 5A:
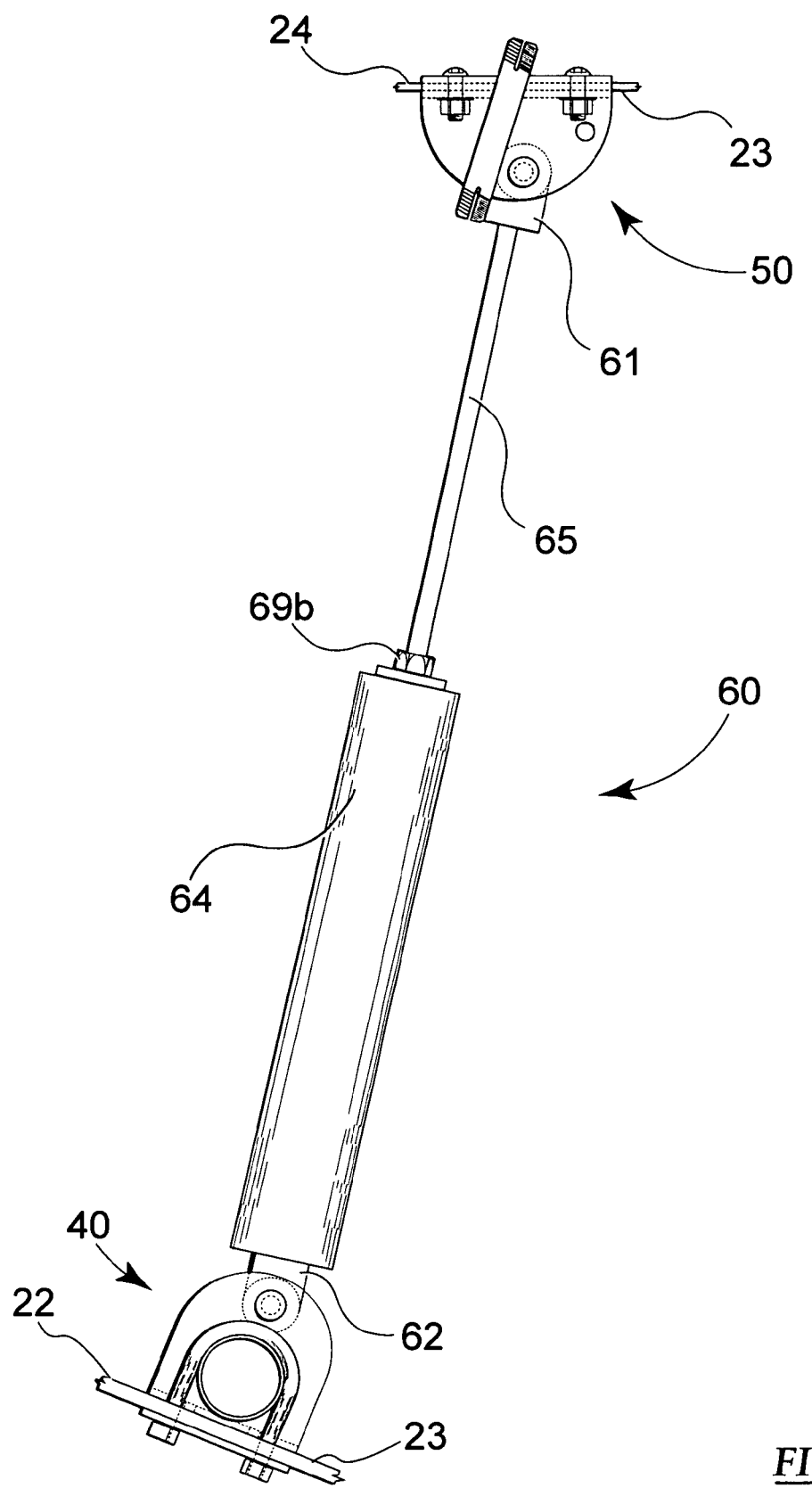
FIG. 5A is an elevation view of an embodiment of the at least one rear strut member of the embodiment of the invention illustrated in FIG. 1A and FIG. 1B, which also illustrates the means of attachment of such rear strut member to the rear frame member, as viewed from the side of the bicycle along the lines 5A-5A in FIG. 1B.
Figure 5B:
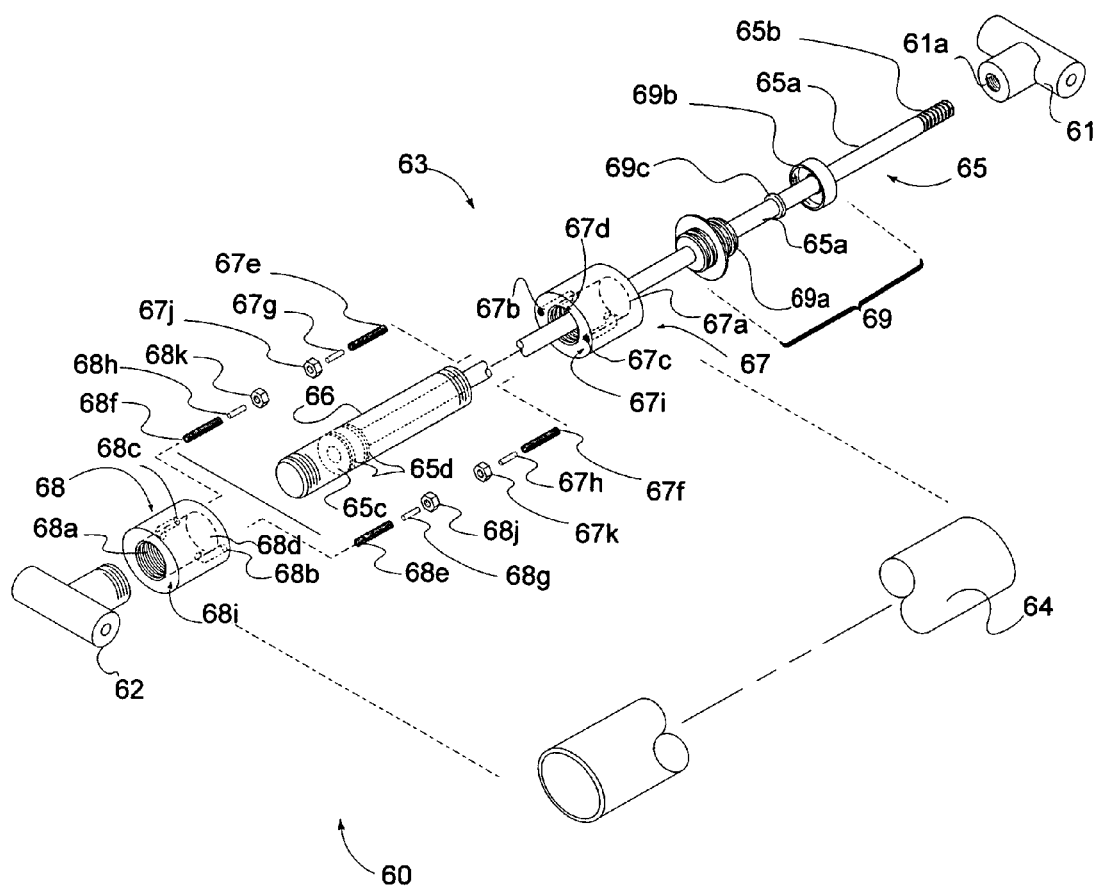
FIG. 5B is an exploded perspective view of the embodiment of the rear strut member illustrated in FIG. 5A, as viewed from the side of and above the rear strut member.

As illustrated in FIG. 1A and FIG. 1B, in some embodiments of this first version of the invention, the rear frame member 20 is also comprised of at least one rear strut member 60. One embodiment of the at least one rear strut member 60 is illustrated in FIG. 5A and FIG. 5B. In this embodiment, the rear strut member 60 has a top strut support bracket 61, a bottom strut support bracket 62, top rear strut connector means, described in more detail below, to connect the top strut support bracket 61 to the seat assembly 50, and bottom rear strut connector means, described in more detail below, to connect the bottom strut support bracket 62 to the crank assembly 40. The top strut support bracket 61, the bottom strut support bracket 62, and the corresponding top rear strut connector means and bottom rear strut connector means, can be of a variety of structures. For example, as illustrated in FIG. 5A and FIG. 5B, the top rear strut support bracket 61 and the bottom rear strut support bracket 62 may each be an approximately T-shaped member having a hollow tubular member as the cross-piece. In this embodiment, the corresponding top rear strut connector means and bottom rear strut connector means may be a pin secured by a cotter pin, a bolt, nut, lock washer combination, or other fastener that passes through the appropriate openings on the seat assembly 50 and the crank assembly 40 and permits a slight degree of rotation of the top strut support bracket 61 and the bottom strut support bracket 62 about the pin, bolt or other fastener. The top rear strut support bracket 61 and the bottom rear strut support bracket 62 may also have a structure similar to that described below for the front strut member 90 (as illustrated in FIG. 1A and FIG. 1B).

In the embodiment of the rear strut member 60 illustrated in FIG. 5A and FIG. 5B, and more particularly in FIG. 5B, the at least one rear strut member 60 is comprised of a piston tube assembly 63 and a strut shroud member 64 covering the piston tube assembly 63. In some of these embodiments, as illustrated in FIG. 5B, the piston tube assembly 63 is comprised of a piston rod member 65, a piston tube member 66, a top valve monoblock member 67, a bottom valve monoblock member 68, a top rear strut support bracket 61, a bottom strut support bracket 62, and a rod guide member 69. In some of these embodiments, as illustrated in FIG. 5B, the piston rod member 65 is comprised of a rod cylindrical member 65a, which is threaded at its top end 65b and has a piston portion 65c at its other end. In various embodiments, the rod cylindrical member 65a and the piston portion 65c may be constructed of a single piece of material or may be constructed of two or more pieces of material that are connected together to form the piston rod assembly, such as by welding, adhesives, epoxies, pins, screws and other fasteners and combinations of all such fastening means currently known in the art or developed in the art in the future. In various embodiments, the rod cylindrical member 65a and the piston portion 65c may also be hollow tubular members. The piston portion 65c of the piston rod member 65 is placed within the piston tube member 66, and the piston portion 65c is of a size adapted to create an airtight seal between the piston portion 65c and the adjacent interior surface of the piston tube member 66. In some embodiments, as illustrated in FIG. 5B, the piston member may also have one or more o-rings 65d positioned on its outer surface that create a seal between the piston portion 65c and the adjacent interior surface of the piston tube member 66. The one or more o-rings 65d may be constructed of neoprene rubber, suitable polymers, such as TEFLON, or other suitable materials and combinations of such materials currently known in the art or developed in the art in the future. In other embodiments of the invention, other means may be used to create the seal between the piston member 65c and the adjacent interior surface of the piston tube member 66. For example, the seal may be created by use of viscous lubricants (such as mineral oil), silicon jell, and other suitable means and combinations of all such means currently known in the art or developed in the art in the future. In the embodiment illustrated in FIG. 5B, the threaded top end 65b of rod cylindrical member 65a is attached to the top rear strut support bracket 61, which has a threaded tap 61a adapted to receive the threads of top end 65b. In other embodiments, other piston rod/support bracket attachment means may be used to connect the top end 65b of the rod cylindrical member 65a to the top rear strut support bracket 61. For example, where the rod cylindrical member 65a and the top rear strut support bracket 61 are constructed of metals, they may be welded together at the top end 65b of the rod cylindrical member 65a. In addition, in other embodiments, adhesives, epoxies, pins, screws, quick release fasteners, and other fasteners and combinations of all such fastening means currently known in the art or developed in the art in the future may be used for this purpose. In some embodiments, the piston tube member 66 is threaded on the exterior surface at each of its ends. In various embodiments, the piston tube member 66 is preferably from approximately 3 inches to approximately 18 inches in length, but is most preferably approximately 6 inches in length. Similarly, in various embodiments, the piston tube member 66 preferably has an inside diameter in the range of approximately ¼ inches to approximately 2 inches, but is most preferably approximately 1 inch.

In the embodiment of the rear strut member illustrated in FIG. 5B, the piston tube assembly 63 is also comprised of a top valve monoblock member 67 and a bottom valve monoblock member 68. In this embodiment, the top valve monoblock member 67 and the bottom valve monoblock member 68 are generally elliptical in shape when viewed from above or below. In various embodiments, the bottom elliptical surface 67i of the top valve monoblock member 67 and the bottom elliptical surface 68i of the bottom valve monoblock member 68 each preferably have a major radius in the range from approximately ½ inches to 3 inches, and a minor radius in the range from approximately ⅜ inches to 2 inches, but most preferably the major radius is approximately 2¼ inches and the minor radius is approximately 1¼ inches. Also in this embodiment, the top valve monoblock member 67 has a cylindrical hole 67a positioned approximately in the center of the top valve monoblock member 67, in which the hole 67a extends the entire length of the top valve monoblock member 67 along its longitudinal axis. In some embodiments of the invention, the cylindrical hole 67a may be threaded its entire length, while in other embodiments the cylindrical hole 67a may be threaded at each end thereof. In the embodiment of the rear strut member illustrated in FIG. 5B, the top valve monoblock member 67 also has two threaded cylindrical cavities 67b, 67c positioned on approximately opposite sides of the center cylindrical hole 67a and an interior chamber 67d that connects the two threaded cylindrical cavities 67b, 67c and the center cylindrical hole 67a so that the two threaded cylindrical cavities 67b, 67c and the central cylindrical hole 67a are in fluidic communication with one another. The interior chamber 67d may be of almost any shape, but is preferably cylindrical in shape and positioned perpendicular to the longitudinal axes of the two threaded cylindrical cavities 67b, 67c and passes through the central cylindrical hole 67a. In the embodiment of the rear strut member illustrated in FIG. 5B, the top valve monoblock member 67 is constructed of steel or steel alloy, and may be formed from a single piece by casting, machining and other metal working processes or combinations of all these processes. In other embodiments, the top valve monoblock member 67 may be constructed of other materials. For example, the top valve monoblock member 67 may be constructed of other metals (such as aluminum or titanium), high strength plastics, and other suitable materials currently known in the art or developed in the art in the future. In still other embodiments, the top valve monoblock member 67 may be constructed from two or more pieces of material that are connected together using appropriate means currently known in the art or developed in the art in the future. In this embodiment, the top valve monoblock member 67 is also comprised of two threaded tubular members 67e, 67f that are threaded on their exterior and interior surfaces. The threads on the exterior surface of the tubular members 67e, 67f are of a size adapted to be received by the threads on the threaded cylindrical cavities 67b, 67c, so that the exterior surface of the tubular members 67e, 67f create an airtight seal with the adjacent surface of the threaded cylindrical cavities 67b, 67c. Also in this embodiment, valve members 67g, 67h, which are similar to valves used on automobile tires and are generally threaded and of a size adapted to be attached to the ends of tubular members 67e, 67f, are attached to the end of the tubular members 67e, 67f opposite the end that is attached to the threaded cylindrical cavities 67b, 67c. One valve member 67g (top in-valve) generally allows air to pass from the area outside the top valve monoblock member 67 through the valve member 67g and into the interior chamber 67d and the center cylindrical hole 67a, but does not allow air to pass in the opposite direction. The other valve member 67h (top out-valve) generally allows air to pass from the interior chamber 67d and the center cylindrical hole 67a through the valve member 67h to the area outside the top valve monoblock member 67, but does not allow air to pass in the opposite direction. The valve members 67g, 67h may be adjusted to regulate the flow of air through them, as described in more detail below.

In the embodiment of the invention illustrated in FIG. 5B, the bottom valve monoblock member 68 is also has a cylindrical hole 68a, two threaded cylindrical cavities 68b, 68c, an interior chamber 68d, two threaded tubular members 68e, 68f, and two valve members 68g (bottom in-valve), 68h (bottom out-valve). In this embodiment, the bottom valve monoblock member 68 is constructed in substantially the same manner, has the same features, and operates in the same manner as the top valve monoblock member 67. In the embodiment of the invention illustrated in FIG. 5B, the top valve monoblock member 67 and the bottom valve monoblock member 68 are connected to the piston tube member 66 in the manner illustrated in FIG. 5B. In this embodiment, the threaded ends of the piston tube member 66 are of a size adapted to be received by the threads of the central cylindrical hole 67a of the top valve monoblock member 67 and the central cylindrical hole 68a of the bottom valve monoblock member 68 so that an airtight seal is created between the exterior threaded surfaces of the piston tube member 66 and the adjacent surfaces of the top valve monoblock member 67 and the bottom valve monoblock member 68. In other embodiments of the invention, the top valve monoblock member 67 and the bottom valve monoblock member 68 may be attached to the piston tube member using other monoblock/piston tube attachment means, such as welding, adhesives, glues, epoxies, and other suitable means and combinations of all such means currently known in the art or developed in the art in the future.

In the embodiment of the invention illustrated in FIG. 5B, the piston tube assembly 63 is also comprised of a rod guide member 69. In this embodiment, the rod guide member 69 is further comprised of a rod guide tube 69a, a rod guide cap 69b, and an o-ring 69c. In this embodiment, the rod guide tube 69a is generally cylindrical in shape with a collar on its exterior surface approximately mid-way between its ends. The rod guide tube 69a has an inner diameter great enough to allow for the rod cylindrical member 65a to slide within the rod guide tube 69a, but a diameter small enough to allow the o-ring 69c to seat against the rod cylindrical member 65a and the rod guide tube 69a to create an airtight seal at this junction. The rod guide cap 69b is generally adapted to be attached to the rod guide tube 69a. Also in this embodiment, the rod guide cap 69b has a cylindrical opening in the center of the top portion thereof that has a diameter great enough to allow for the rod cylindrical member 65a to slide within it. The rod guide tube 69a of this embodiment is threaded on both ends, with the threads on one end of the rod guide tube 69a being of a size adapted to be received by the threads of the central cylindrical hole 67a of the top valve monoblock member 67 and the threads on the other end of the rod guide tube 69a being of a size adapted to be received by the threads of the rod guide cap 69b so that an airtight seal is created at the junction of such threaded surfaces. In other embodiments of the invention, the rod guide tube 69a may be attached to the top valve monoblock member 67 using other monoblock/rod guide attachment means, such as welding, adhesives, glues, epoxies, and other suitable fasteners and means and combinations of all such fasteners and means currently known in the art or that may be developed in the art in the future.

In addition, in these embodiments, the bottom rear support bracket 62 is threaded on the end thereof that is to be attached to the bottom valve monoblock member 68, with such threads being of a size adapted to be received by the threads of the central cylindrical hole 68a of the bottom valve monoblock member 68a so that an airtight seal is created between such threaded surfaces. In other embodiments of the invention, the bottom rear support bracket 62 may be attached to the bottom valve monoblock member 68 using other monoblock/bottom support bracket attachment means, such as welding, adhesives, glues, epoxies, and other suitable means and combinations of all such means currently known in the art or that may be developed in the art in the future.

One means to assemble the embodiment of the rear strut member illustrated in FIG. 5B is now described. The bottom rear support bracket 62 may be screwed into the central cylindrical hole 68a of the bottom valve monoblock member 68. This seals the bottom end of the bottom valve monoblock member 68 below the interior chamber 68d. The rod guide tube 69a may then be screwed into the central cylindrical hole 67a of the top valve monoblock member 67. The piston portion 65c of the piston rod member 65 is inserted into the piston tube member 66. The threaded end 65b of the piston rod member 65 is then passed through the central cylindrical hole 67a of the top valve monoblock member 67. The end of the piston tube member 66 is then screwed into the central cylindrical hole 67a of the top valve monoblock member 67. The other end of the piston tube member 66 is then screwed into the central cylindrical hole 68a of the bottom valve monoblock member 68. The o-ring 69c is then placed over the threaded end 65b of the rod cylindrical member 65a and slid down until it seats against the rod guide tube 69a. The rod guide cap 69b is then placed over the threaded end 65b of the piston tube 65a and slid down the rod cylindrical member 65a until it reaches the rod guide tube 69a, where it is screwed into place on the rod guide tube 69a. The strut shroud 64 is then placed over the piston tube assembly 63 and is attached to the top valve monoblock member 67 or the bottom valve monoblock member 68 or both by means of welds, glues, adhesives, screws, pins, quick release fasteners, or other fasteners currently known in the art or that may be developed in the art in the future. Preferably, the means of such attachment allow the strut shroud 64 to be removably attached to the piston tube assembly 63.

The at least one rear strut member 60 thus provides load dampening-type functions for the rear frame member 20 in some embodiments of the invention. In other embodiments, the at least one rear strut member 60 may also provide additional support for the rear frame member 20. In the embodiment of the at least one rear strut member 60 illustrated in FIG. 5B, when the piston rod member 65 is pressed down, air is drawn into the volume of the piston tube member 66 above the piston portion 65c of the piston rod member 65 and air is expelled from the volume of the piston tube member 66 below the piston portion 65c of the piston rod member 65. The opposite occurs when the piston rod member 65 is drawn up. As illustrated in FIG. 5B, the valve members 67g, 67h, 68g, 68*h* may also each comprise a cap 67*j*, 67*k*, 68*j*, 68*k*, which may or may not have a small orifice on the top surface thereof. The greater the size of the orifice, the greater the potential flow of air through the valve member 67*g*, 67*h*, 68*g*, 68*h*, and the less the resistance to movement of the piston rod member 65 within the piston tube member 66. Thus, in various embodiments of the invention, the valve members 67*g*, 67*h*, 68*g*, 68*h* may be adjusted to vary the support and load dampening characteristics of the at least one rear strut member 60. For example, to substantially eliminate resistance to movement of the piston rod member 65 within the piston tube member 66, all of the valve members 67*g*, 67*h*, 68*g*, 68*h* may be opened completely. To maximize the resistance to movement of the piston rod member 65 within the piston tube member 66, all of the valve members 67*g*, 67*h*, 68*g*, 68*h* may be closed completely. To maximize the resistance to downward movement of the piston rod member 65 within the piston tube member 66, while maintaining minimum resistance to upward movement of the piston rod member 65 within the piston tube member 66, the top in-valve member 67*g* and the bottom out-valve member 68*h* may be closed and the top out-valve members 67*h* and the bottom in-valve member 68*g* may be opened. To maximize the resistance to upward movement of the piston rod member 65 within the piston tube member 66, while maintaining minimum resistance to downward movement of the piston rod member 65 within the piston tube member 66, the top in-valve member 67*g* and the bottom out-valve member 68*h* may be opened and the top out-valve members 67*h* and the bottom in-valve member 68*g* may be closed. For intermediate levels of resistance in both directions of movement of the piston rod member 65 within the piston tube member 66, all of the valve members 67*g*, 67*h*, 68*g*, 68*h* may be partially opened in varying amounts to provide the level of resistance desired.

It is to be noted that in other embodiments of this first version of the invention, there may be more than one rear strut member 60. The number of rear strut members to be used depends upon the level of support desired, the performance characteristics of the rear strut members, and the individual taste of the operator of the bicycle. In addition, in other embodiments, the at least one rear strut member 60 may be connected to other portions of the rear frame member 20, such as the downward frame portion 22, the distal frame portion 23, or the top frame portion 24, rather than being connected to the crank assembly 40 and the seat assembly 50. In these embodiments, the means of connecting the at least one rear strut member 60 to the rear frame member 20 may be any means currently known in the art or that may be developed in the art in the future, such as means similar to the means of connecting the seat assembly 50, the crank assembly 40, and the rear wheel assembly 70 to the rear frame member 20, or the at least two front strut members 90, 91 to the front frame member 80, all as described in more detail herein in connection with the embodiment of the first version of the invention illustrated in FIG. 1A and FIG. 1B. In yet other embodiments of this first version of the invention, the at least one rear strut member 60 may be comprised of a different structure than that illustrated in FIG. 5A and FIG. 5B. For example, the at least one rear strut member 60 may be comprised of a conventional type of shock absorbing system, which are currently well known in the art, or a shock absorbing system that may be developed in the art in the future. In such embodiments, the means of attaching the at least one rear strut member to the rear frame member may be any suitable means currently known in the art or developed in the art in the future.

It is also to be noted that in various embodiments of this first version of the invention the rear frame member may not have any rear strut member 60.

Figure 6A:
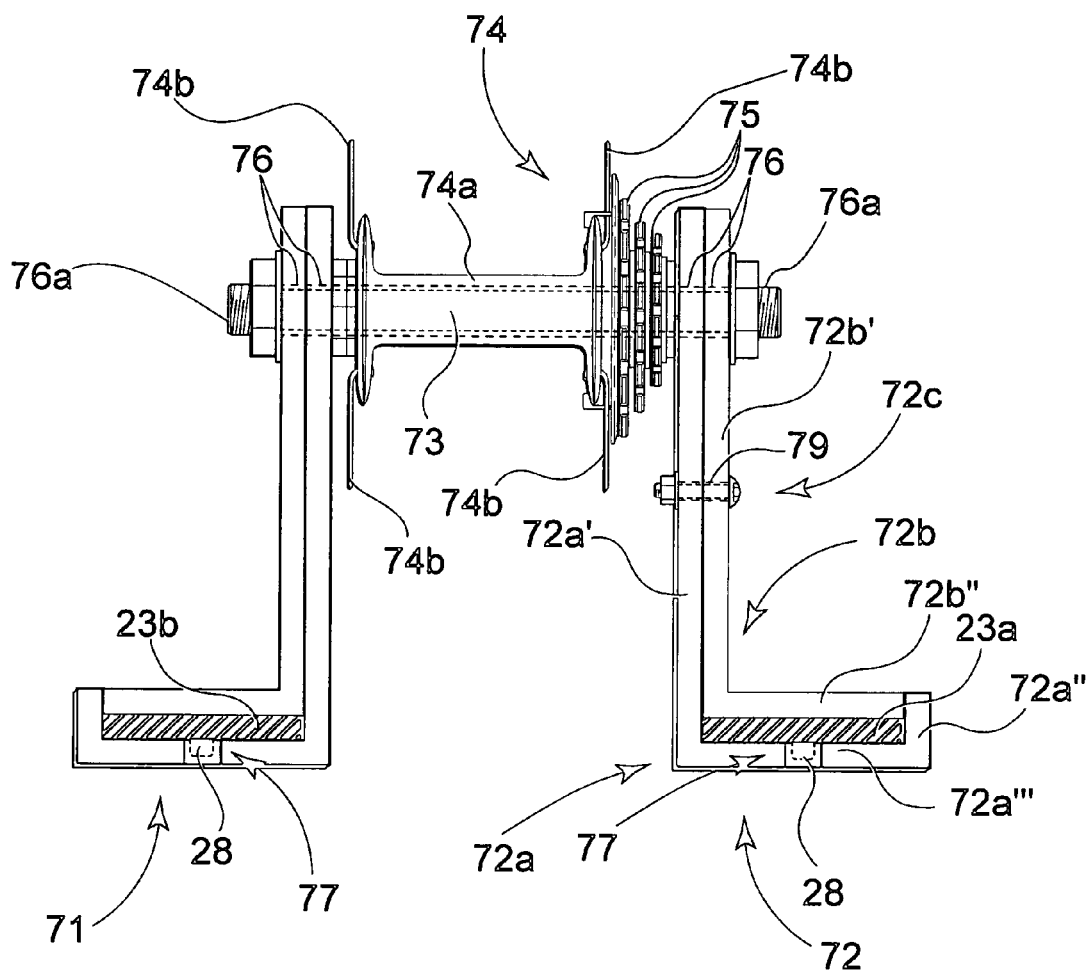
FIG. 6A is a cross-sectional elevation view of the embodiment of the rear wheel assembly illustrated in FIG. 1A and FIG. 1B, taken along the lines 6A-6A in FIG. 1B.
Figure 6B:
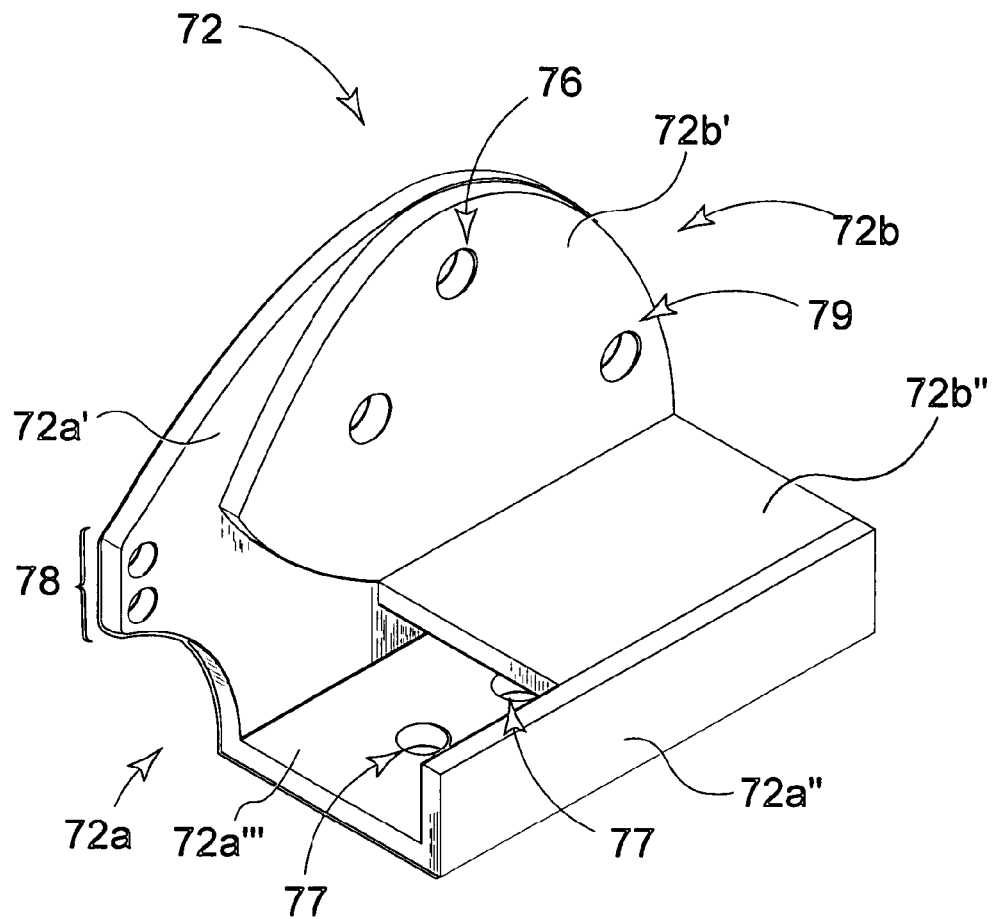
FIG. 6B is a perspective view of an embodiment of a rear wheel clamp member of the rear wheel assembly illustrated in FIG. 6A, as viewed from the side of and above the rear wheel clamp member.

In some embodiments of this first version of the invention, as illustrated in FIG. 1A and FIG. 1B, the rear frame member 20 further comprises a rear wheel assembly 70 and rear wheel assembly attachment means to attach the rear wheel assembly 70 to the rearwardly extending portion of the rear parallel portions 23*a*, 23*b* of the distal frame portion 23 of the rear frame member 20. In the embodiment of the rear wheel assembly 70 of the first version of the invention illustrated in FIG. 6A, the rear wheel assembly 70 is comprised of at least two rear wheel clamp members 71, 72, a cylindrical rear wheel axle member 73, a rear bicycle wheel 74 (of which only the wheel hub 74*a* and wheel spokes 74*b* are illustrated), rear wheel mounting means, as described in more detail below, to rotationally mount the rear bicycle wheel 74 on the rear wheel axle member 73, and rear wheel axle attachment means, as described in more detail below, to connect the rear wheel axle member 73 to the two rear wheel clamp members 71, 72. In such embodiment, the rear wheel assembly attachment means is comprised of the at least two rear wheel clamp members 71, 72, which are each attached to one of the rear parallel portions 23*a*, 23*b* of the distal frame portion 23 on opposite sides of the rear bicycle wheel 74. The at least two rear wheel clamp members 71, 72 are illustrated in the detailed perspective view of FIG. 5B. Other rear wheel assembly attachment means may be used in other embodiments of the invention. For example, the rear wheel assembly attachment means may also be a bracket system of any geometry that is suitable for attaching the rear wheel assembly 70 to the rear parallel portions 23*a*, 23*b* of the distal frame portion 23, including being molded or laminated into the frame member. In yet other embodiments, the rear wheel assembly attachment means, such as the at least two rear wheel clamp members 71, 72 or any similar structures performing the same function, may be laminated or molded or otherwise fabricated as a part of the rear frame member 20. In the embodiment of the invention illustrated in FIG. 6A, the rear axle member 73 has two ends and extends between, and passes through openings 76 in, the at least two rear wheel clamp members 71, 72. In the illustrated embodiment, the rear wheel axle attachment means is used to attach the rear axle member 73 to the rear wheel clamp members 71, 72 are nuts and lock washers 76*a* that are screwed onto threaded ends of the rear axle member 73. There are, however, many rear wheel axle attachment means currently well known in the art, such as quick release mechanisms, wing nuts, quick release fasteners, and other attachment means, that may be used in various embodiments of the present invention to attach the rear axle member 73 to the rear wheel clamp members 71, 72. In addition, there are many rear wheel mounting means, which may be used in various embodiments of the present invention to mount the rear bicycle wheel 74 on the rear axle member 73, currently well known in the art. In the embodiment of the invention illustrated in FIG. 6A, the rear wheel mounting means is a wheel hub 74*a* with roller bearings that fit over the rear wheel axle member 73. In addition, in some embodiments of this first version of the invention, as illustrated in FIG. 6A, the rear wheel assembly 70 may also comprise a gear drive member, which may be comprised of one or more chain sprockets 75 mounted on the wheel hub 74*a*. In these embodiments, the one or more chain sprockets 75 may be connected to a chain sprocket on the crank assembly 40 by means of a chain drive member, such as a bicycle chain, so that by rotating the chain sprocket of the crank assembly 40 the operator of the bicycle 15 also causes the rear wheel 74 to rotate. Such chain-sprocket systems for bicycles, which may be used in various embodiments of the present invention, are well known in the relevant art. In some embodiments of this first version of the invention, the rear wheel assembly 70 may be further comprised of a derailleur system that is used to switch the chain drive member from one chain sprocket 75 to another chain sprocket 75. The derailleur system may be connected to one of the rear wheel clamp members 71, 72 by using any suitable means, such as by welds, screws, bolt, nut and washer assemblies, quick release fasteners, or other fasteners or means currently known in the art or that may be developed in the art in the future. In these embodiments, the rear wheel assembly 70 may also comprise a derailleur control member to control the operation of the derailleur system. Such derailleur control members, which are well known in the art, may include switches located on the steering mechanism 25 of the bicycle 15 that are connected by wires in a flexible sheath to the derailleur system. It is to be noted, however, that in other embodiments of the invention any type of drive mechanism currently known in the art or that may be developed in the art in the future may be used to rotate the rear bicycle wheel 74. It is also to be noted that such drive mechanism may also include a power source and any means of connecting the power source to the rear bicycle wheel 74, such as in the case of an electric or gasoline powered motor connected to the rear bicycle wheel 74 by a drive shaft and gear system. In some embodiments, the rear wheel assembly 70 further comprises at least one disc brake member and disc brake attachment means to attach the at least one disc brake member to one or more of the at least two rear wheel assembly clamp members. Such disc brake systems for bicycles, which may be used in various embodiments of the present invention, are well known in the relevant art. As illustrated in FIG. 6B, either or both of the rear wheel clamp members 71, 72 may have openings 78 therein that may be used for attachment of such disc brake systems. In other embodiments of this first version of the invention, conventional caliper-type brake systems that create friction by clamping down on the outer rim of the rear bicycle wheel 74 may also be used. Such caliper-type brake systems, which are well known in the art, may be connected to the rear frame member 20 in any appropriate location and may be controlled by levers or other means located on the steering mechanism 25 that may be connected to the brake system by means of wires in a flexible sheath. In yet other embodiments, the rear frame member 20 may include a breaking system that involves an appropriate mechanism in the wheel hub 74a, so that when the pedals of the crank assembly 40 are moved in the direction opposite that used for forward propulsion of the bicycle 15, braking force is applied to the rear bicycle wheel 74. Such braking systems are well known in the art.

A perspective view of rear wheel clamp member 72 is illustrated in FIG. 6B. In this embodiment, rear wheel clamp member 71 is substantially the same as, but is a mirror image of, rear wheel clamp member 72. In this embodiment, rear wheel clamp member 72 is comprised of a rear wheel assembly outer plate 72a and a rear wheel assembly inner plate 72b. In this embodiment, the rear wheel assembly outer plate 72a is comprised of a first outer vertical plate portion 72a' having a flat surface, a second outer vertical plate portion 72a'' having a flat surface parallel to the first outer vertical plate portion 72a', and a horizontal outer plate portion 72a''' extending perpendicular from the flat surface at one end of the first outer vertical plate portion 72a' to the flat surface at one end of the second outer vertical plate portion 72a''. This creates an approximately U-shaped rear wheel assembly outer plate 72a, with the outer horizontal plate portion 72a''' having a flat interior surface. Also in this embodiment, the rear wheel assembly inner plate 72b is comprised of an inner vertical plate portion 72b' having a flat surface and a horizontal inner plate portion 72b'' extending perpendicular from the flat surface at one end of the first inner vertical plate portion 72b' creating an approximately L-shaped member, wherein the exterior surface of the horizontal inner plate portion 72b'' is flat. In the illustrated embodiment, the flat surface of the first outer vertical plate portion 72a' is placed adjacent to the flat surface of the inner vertical plate portion 72b' and the flat interior surface of the horizontal outer plate portion 72a''' and the flat exterior surface of the horizontal inner plate portion 72b'' are placed adjacent to the rear parallel portion 23a of the distal frame portion 23 to which the rear wheel clamp member 72 is attached so that the rear parallel portion 23a is held in place frictionally by the rear wheel assembly inner plate 72b and the rear wheel assembly outer plate 72a. In the illustrated embodiment, the rear wheel clamp attachment means, which is used to attach the rear wheel assembly inner plate 72b to the rear wheel assembly outer plate 72a is a bolt, nut and lock washer combination 72c that passes through an opening 79 in the rear wheel clamp member 72. In other embodiments of the invention, the rear wheel clamp attachment means may be comprised of welding, adhesives, epoxies, pins, screws, quick release fasteners, and other fasteners and combinations of all such fastening means currently known in the art or developed in the art in the future. In some embodiments of this first version of the invention, each rear parallel portion 23a, 23b of the distal frame portion 23 may have at least one pin 28 and the rear wheel assembly clamp member 71, 72 has the same number of holes 77 as the number of such pins 28 and the holes 77 receive the pins 28 to hold the rear wheel assembly 70 in place relative to the rear parallel portions 23a, 23b. In other embodiments, the rear wheel assembly clamp member 71, 72 has at least one pin and each rear parallel portion 23a, 23b of the distal frame portion 23 has the same number of holes as the number of such pins and the holes receive the pins to hold the rear wheel assembly 70 in place relative to the rear parallel portions 23a, 23b. As illustrated in FIG. 6A and FIG. 6B, the preferred number of pins and holes in these embodiments is two pins and two holes.

In some embodiments of this first version of the invention, as illustrated in FIG. 1A and FIG. 1B, the bicycle 15 is further comprised of a front frame member 80 and frame connection means to pivotally connect the rear frame member 20 to the front frame member 80. The frame connection means of these embodiments, which are described in more detail below, allow a point of the front frame member 80 to pivot about a point on the rear frame member 20. In these embodiments, the rear frame head portion 21 is the portion of the rear frame member 20 that is located adjacent to the front frame member 80 so that the front frame member 80 pivots about the distal end of the rear frame head portion 21. It is to be noted, however, that the rear frame member 20 generally disclosed and described herein in conjunction with FIG. 1A and FIG. 1B, as one aspect of the bicycle 15, may alone be a separate embodiment of this first version of the invention. It is also to be noted that in some embodiments of this first version of the invention, the bicycle 15 may further comprise a front frame portion comprised of any type of front bicycle frame portion that currently exists in the art or that may be developed in the art in the future, rather than the front frame member 80 illustrated in FIG. 1A and FIG. 1B. For example, the front frame member may be comprised of a conventional front bicycle fork assembly, which generally has a head member that pivotally attaches to the rear frame member 20 and two fork members attached to the head member that extend approximately downwardly and forwardly, wherein the front bicycle wheel is attached to the distal end of such two fork members. Such front bicycle fork assemblies are well known in the art. In addition, the front frame member 80 generally disclosed and described herein in conjunction with FIG. 1A and FIG. 1B, as a second aspect of the bicycle 15, may alone be a separate embodiment of this first version of the invention. In other words, the various embodiments of the front frame member 80 illustrated and described below in connection with FIG. 1A and FIG. 1B, which front frame member 80 may be used for any appropriate purpose independent of the rear frame member 20, constitute separate embodiments of the present invention. It is also to be noted that in some embodiments in this first version of the invention, the front frame member 80 may further comprise a rear frame portion comprised of any type of rear bicycle frame portion that currently exists in the art or that may be developed in the art in the future, rather than the rear frame member 20 illustrated in FIG. 1A and FIG. 1B. Such rear frame portions, which may be the same as rear frame portions commonly used with conventional bicycles, are also well known in the art.

In the embodiment of this first version of the invention illustrated in FIG. 1A and FIG. 1B, the front frame member 80 is comprised of a front frame head portion 81 and two front parallel portions 82a, 82b. In this embodiment, the front frame head portion 81 is the portion of the front frame member 80 that is adjacent to the rear frame head portion 21, so that the rear frame member 20 pivots about the front frame head portion 81. The front parallel portions 82a, 82b generally extend forwardly from the front frame head portion 81, then forwardly and downwardly, and then rearwardly and downwardly, circumscribing an arc until the two front parallel portions 82a, 82b are extending approximately rearwardly. Although the arc illustrated in the embodiment of FIG. 1A and FIG. 1B is circular in shape, in other embodiments the arc may be comprised of different types of curvatures (such as elliptical or parabolic shapes) or combinations of curvatures (such as approximately elliptical on the lower portion of the front parallel portions 82a, 82b and approximately circular on the top portion of the front parallel portions 82a, 82b. The two front parallel portions 82a, 82b are separated by a distance adequate to permit a front bicycle wheel 104 to be positioned between them. It is to be noted that by use of the term "parallel" to describe the two front parallel portions 82a, 82b, it is intended that they may generally mirror one another in shape and need not necessarily be spaced an equal distance apart. The distance the two front parallel portions 82a, 82b are split apart is dependent upon the width of a front wheel assembly 100 (on which is mounted the rear bicycle wheel 104) that may be used with the front frame member 80 in various embodiments of the invention, as described in more detail below. Also in this embodiment of this first version of the invention, the front frame head portion 81 of the front frame member 80 is comprised of a front top plate member 83, at least two tubular members 84a, 84b, a front bottom plate member 85, and front head attachment means to attach the front top front plate member 83 to one end of each of the at least two tubular members 84a, 84b and to attach the front bottom plate member 85 to the other end of each of the at least two tubular members 84a, 84b. In some of these embodiments, the front parallel portions 82a, 82b extend from the front top plate member 83. In other embodiments, the front parallel portions 82a, 82b may extend from the front bottom plate member 85. In still other embodiments, the front frame head member 81 may have geometries different from that illustrated in FIG. 1A and FIG. 1B. Almost any geometry may be used for this purpose, as long as such geometry allows for connection of the front frame head member 81 to the rear frame member 20, approximately forward extension of the front parallel portions 82a, 82b, attachment of the front strut members 90, 91 to the front frame head portion 81, and proper operation of the bicycle 15.

In some embodiments of this first version of the invention, as illustrated in FIG. 1A and FIG. 1B, portions of the front frame head portion 81 and the two front parallel portions 82a, 82b are comprised of materials from the group consisting of flexible materials, semi-rigid materials, and combinations of such materials. It is to be noted, however, that such materials may provide for flexure in one or more directions, but may provide a degree of rigidity in other directions. For example, various portions of the front frame member 80 may be constructed of a lamination of titanium and carbon fiber composite. In these embodiments, the lamination of titanium and carbon fiber composite may be oriented so that a relatively high degree of flexure is provided in the vertical direction (when viewing the front frame member 80 from the perspective of a standing bicycle 15), but a relatively low degree of flexure is provided in the horizontal direction. Thus, a front frame head portion 81 and two front parallel portions 82a, 82b comprised of a lamination of titanium and carbon fiber composite would allow the front frame member 80 to flex up and down, but not to the sides. Generally, the widths and thicknesses of the various portions of the front frame member 80 are dependent upon the size of the front frame member 80, its anticipated use, and the characteristics of the materials used to construct the front frame member 80. In the embodiment of the invention illustrated in FIG. 1A and FIG. 1B, the width and thickness of the front frame head portion 81 depends upon the material used to construct the front frame head portion 81. Such width and thickness is great enough to provide adequate support for the weight to be supported by the front frame member 80, but small enough to retain the desired degree of flexibility of the front frame member 80. In embodiments of the invention where the front frame member 80 is constructed primarily of a lamination of titanium and carbon fiber composite, the front frame head portion 81 preferably has a width in the range from ¾ inches to 2 inches, as viewed from above the front frame member 80 (as illustrated in FIG. 1B), and a thickness in the range from ⅛ inches to ½ inches. The length of the front frame head portion 81 adjacent to the steering mechanism 25, as measured from the point of attachment of the front frame head portion 81 to the rear frame member 20 to the point at which the two front parallel portions 82a, 82b extend from the front frame head portion 81, is dependent upon a number of factors, such as the anticipated use and size of the bicycle 15. It is preferred, however, that such length be in the range from approximately 3 inches and 8 inches. It is to be noted, however, that a portion of the front frame head portion 81 adjacent to the bicycle steering mechanism 25 may be constructed entirely of a rigid material (such as titanium, steel, steel alloy, or aluminum) to withstand the forces associated with steering the bicycle 15. In the embodiment of the invention illustrated in FIG. 1A and FIG. 1B, the widths and thicknesses of the front parallel portions 82a and 82b are approximately the same and depend upon the material used to construct the front parallel portions 82a and 82b. Such widths and thicknesses are great enough to provide adequate support for the weight to be supported by the front frame member 80, but small enough to retain the desired degree of flexibility of the front frame member 80. In embodiments of the invention where the front frame member 80 is constructed primarily of a lamination of carbon fiber composite and titanium, the front parallel portions 82a and 82b preferably have a width in the range from ⅜ inches to 2 inches, as viewed from above the front frame member 80 (as illustrated in FIG. 1B) and a thickness in the range from ⅛ inches to ½ inches. In other embodiments of the invention illustrated in FIG. 1A and FIG. 1B, the front frame head portion 81 and the front parallel portions 82a, 82b may be constructed in whole or in part of any materials currently known in the art or that may be developed in the art in the future that provide an adequate level of support for the anticipated load to be borne by the front frame member 80, while still maintaining the flexible nature of the front frame member 80. Examples include carbon fiber composites, steel, steel alloys, aluminum, titanium, other metals, fiberglass, plastics, rubber, or wood or laminates or any combinations of the same. Examples of suitable wood laminates include layers of oak, ebony, lignum vitae, and teak or combinations of the same, which are inter-layered with adhesive materials suitable to permanently bind the wood layers of the laminate together. It is also to be noted that the above materials may also be laminated with one another. For example, portions of the front frame member 80 may be comprised of laminates of carbon fiber and titanium, carbon fiber and fiberglass, or carbon fiber and wood. It is also to be noted that the various portions of the front frame member 80 may be constructed of combinations of materials in different embodiments of the invention. For example, the front top plate member 83, the front bottom plate member 85, and the two front parallel portions 82a and 82b may be constructed of titanium, steel or aluminum and the at least two tubular members 84a, 84b may be constructed of titanium, steel or aluminum tubing. It is preferred, however, that all portions of the front frame member 80 be constructed of the same material for ease in manufacturing the front frame member 80. In the embodiment of the invention illustrated in FIG. 1A and FIG. 1B, the two front parallel portions 82a and 82b each have a cross-section shaped as a rectangle. In other embodiments of this first version of the invention, however, the cross sections of the two front parallel portions 82a and 82b may be of almost any shape desired by the user of the front frame member 80. For example, the cross sections of the front parallel portions 82a and 82b may be of other shapes, such as a circle or an ellipse, or a parallelogram, a trapezoid, a rectangle, a square, or any combination thereof having one or more concave or convex arched surfaces, or any combination of all such shapes. The preferred cross-sectional shape of the front parallel portions 82a and 82b is dependent upon the taste of the user of the front frame member 80 and the materials used to construct the various portions of the front frame member 80. The more preferred shapes are rectangular, rectangular with an arched surface, square or a combination of one or more of such shapes.

Figure 7A:
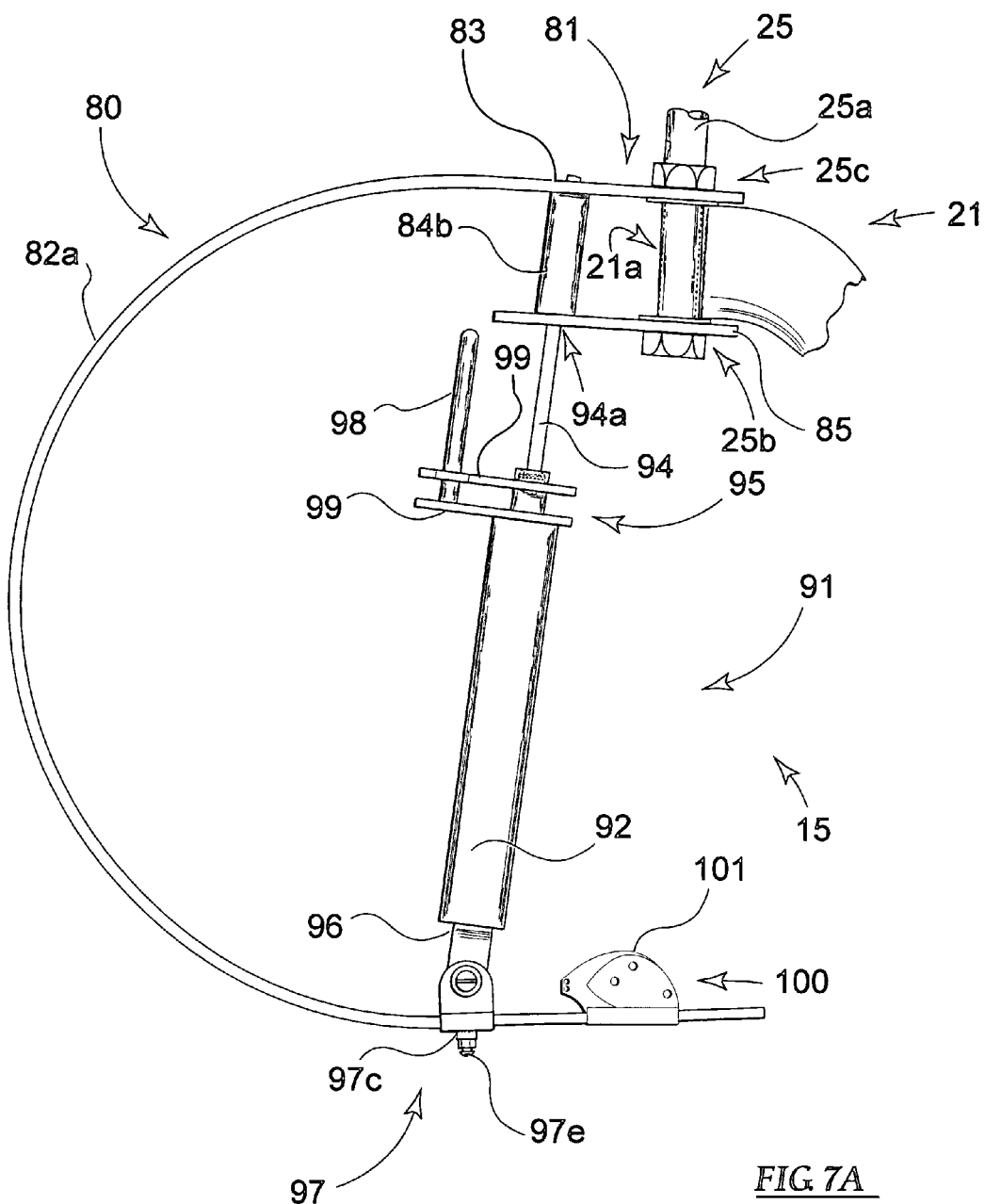
FIG. 7A is an elevation view of an embodiment of the front frame member of the embodiment of the invention illustrated in FIG. 1A and FIG. 1B, but without the front bicycle wheel, as viewed along the lines 7A-7A in FIG. 1B.
Figure 7B:
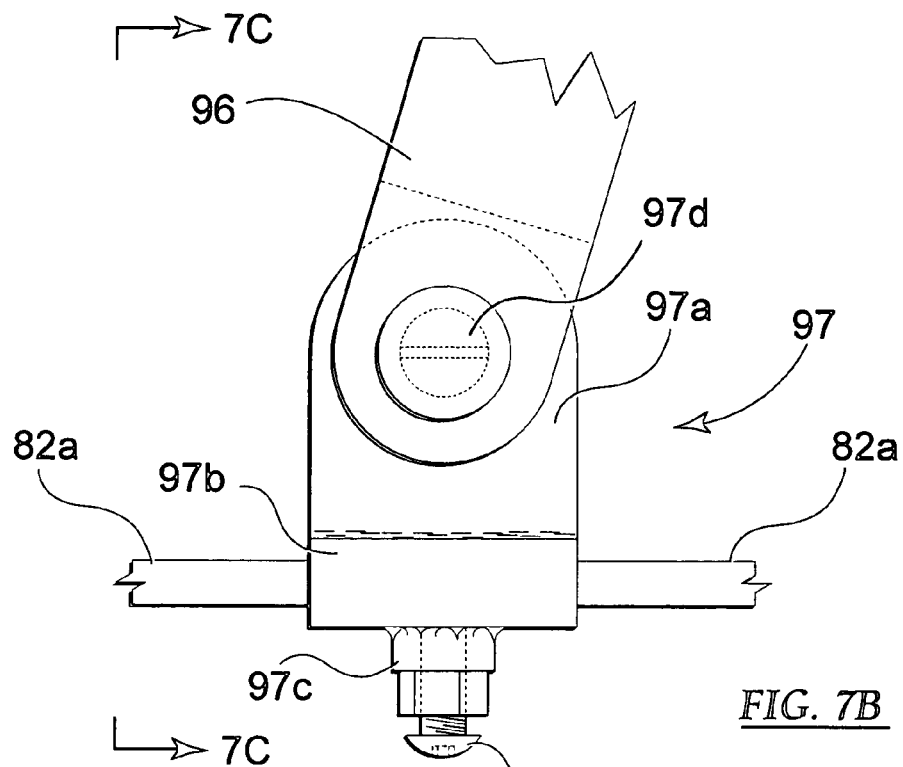
FIG. 7B is an enlarged elevation view of the embodiment of the frame bracket member illustrated in FIG. 7A, which frame bracket member is used to connect a front strut member to a front parallel portion of the front frame member, as viewed from the side of the bicycle.
Figure 7C:
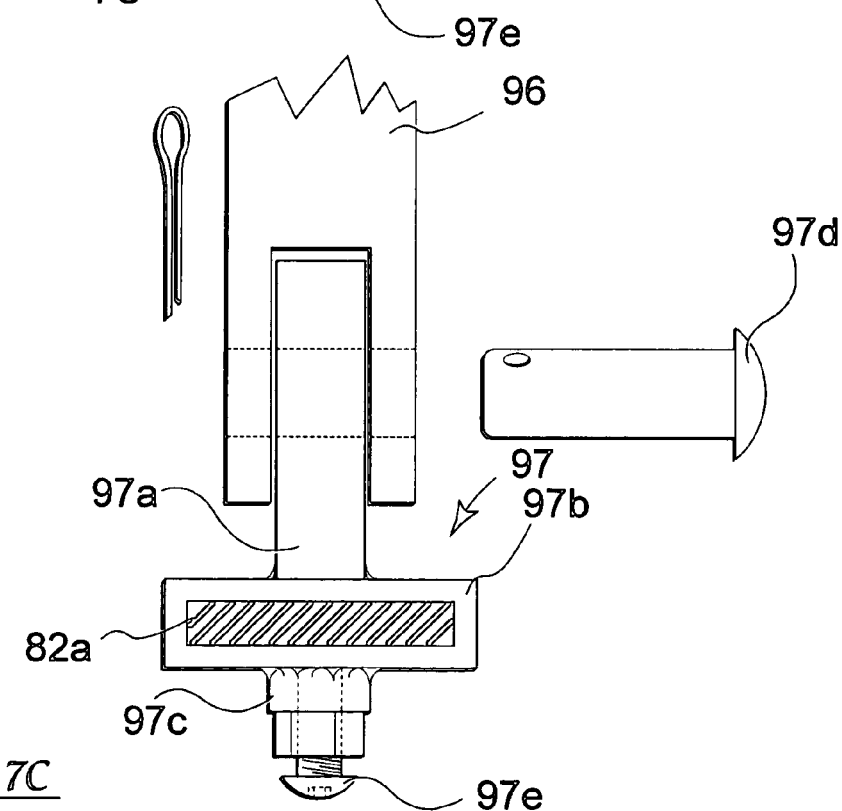
FIG. 7C is an enlarged cross-sectional elevation view of the frame bracket member illustrated in FIG. 7B, as viewed from a position forward of the frame bracket member along the lines 7C-7C in FIG. 7B.

In other embodiments of this first version of the invention, as illustrated in FIG. 1A and FIG. 1B, the front frame member 80 is further comprised of at least two front strut members 90, 91. An elevation view of this embodiment of the front frame member 80 from the side of the bicycle 15 is provided in FIG. 7A. In these embodiments, the two front strut members 90, 91 have substantially the same structure, features and operations as the at least one rear strut member 60 described above in connection with FIG. 5B, except as noted otherwise in the following description of the at least two strut members 90, 91. In this embodiment, each front strut member 90, 91, as illustrated in FIG. 7A by front strut member 91, has a strut shroud 92 (including a piston tube assembly therein), a piston rod member 94 with a threaded top end 94a, a rod guide member 95, and a bottom front support bracket 96. In this embodiment, the top front strut member connector means, which is used to connect the front strut member 91 to the front bottom plate member 85 of the front frame head portion 81, is comprised of a threaded interior surface at the bottom of tubular member 84b, which is of a size adapted to receive the threaded top end 94a of the piston rod member 94. In other embodiments of the invention, the top front strut member connector means may be comprised of welding, adhesives, epoxies, pins, screws, quick release fasteners, and other fasteners and means and combinations of all such fastening means currently known in the art or developed in the art in the future. In addition, in other embodiments, the piston rod member 94 may be connected to portions of the front frame head portion 81 other than the tubular member 84b, such as the front bottom plate member 85. In these embodiments, the same means may be used to connect the front strut member 91 to the front frame head portion 81. In the embodiment of the invention illustrated in FIG. 7A, the bottom front strut member connector means, which is used to connect the bottom front support bracket 96 of the front strut member 91 to the front parallel portion 82a is comprised of the frame bracket member 97, which is illustrated in greater detail in FIG. 7B (which is the same elevation view from the side of the bicycle 15 as in FIG. 7A) and FIG. 7C (which is an elevation view taken along the line 7C-7C in FIG. 7B). In this illustrated embodiment, the frame bracket member 97 is comprised of a frame vertical plate portion 97a, a front bracket support portion 97b that surrounds the portion of the front parallel portion 82a to which the frame bracket member 97 is attached, a bracket securing portion 97c that is used to secure the frame bracket member 97 to the front parallel portion 82a, and a strut securing portion 97d that is used to connect the frame bracket member 97 to the bottom front support bracket 96 of the front strut member 91. In the embodiment illustrated in FIG. 7B and FIG. 7C, the frame vertical plate portion 97a may be attached to the front bracket support portion 97b using any suitable means, such as welding, adhesives, epoxies, pins, screws, quick release fasteners, and other fasteners and combinations of all such fastening means currently known in the art or developed in the art in the future. Also in such embodiment, the bracket securing portion 97c may be attached to the front bracket support portion 97b using welding, adhesives, epoxies, quick release fasteners, and other fastening means and combinations of all such fastening means currently known in the art or developed in the art in the future. Alternatively, the frame vertical plate portion 97a, the front bracket support portion 97b, and the bracket securing portion 97c may be fabricated (such as by casting or machining or a combination thereof) from a single piece of material. In this embodiment, the frame bracket member 97 is secured to the front parallel portion 82a by screwing a bolt 97e into the bracket securing portion 97c until it is pressed against the front parallel portion 82a in a manner so that the frame bracket member 97 is held in place relative to the front parallel portion 82a by friction. In other embodiments, the front parallel portion 82a may also have a hole therein positioned so that the bolt 97e is screwed partially or wholly into such hole to help hold the frame bracket member 97 in place relative to the front parallel portion 82a. In the embodiment illustrated in FIG. 7B and FIG. 7C, the strut securing portion 97d that is used to connect the frame bracket member 97 to the bottom front support bracket 96 of the front strut member 91 is a cylindrical pin secured in place by a cotter pin. In other embodiments, the frame vertical plate portion 97a may be attached to the bottom front support bracket 96 of the front strut member 91 using other suitable means, such as bolt, nut and lock washer combinations, quick release fasteners, and other fasteners and combinations of all such fastening means currently known in the art or developed in the art in the future.

In other embodiments of the invention, the bottom front support bracket 96 of the front strut member 91 may be connected to portions of the front frame member 80 other than the front parallel portions 82a. For example, the bottom front support bracket 96 may be attached to a front wheel assembly, which is described in more detail below. In the embodiment of the invention illustrated in FIG. 1A and FIG. 1B, the same means described and illustrated above in connection with FIG. 7A through FIG. 7C may be used to connect the front strut member 90 to front parallel portion 82b and front frame head portion 81 of the front frame member 80. In the embodiment of the invention illustrated in FIG. 1A, FIG. 1B and FIG. 7A, the front frame member 80 further comprises a stabilizing loop member 98 having two ends and guide attachment plates 99 as loop attachment means to attach each end of the stabilizing loop member 98 to the rod guide member 95 of each of the two front strut members 90, 91. In this embodiment, the guide attachment plates 99 may be attached to the rod guide member 95 of each of the two front strut members 90, 91 using any suitable means, such as welding, adhesives, epoxies, pins, screws, quick release fasteners and other fasteners and combinations of all such fastening means currently known in the art or developed in the art in the future. The same means may also be generally used to attach the stabilizing loop member 98 to the guide attachment plates 99.

In other embodiments of this first version of the invention, as illustrated in FIG. 1A and FIG. 1B, the front frame member 80 is further comprised of a front wheel assembly 100 and front wheel assembly attachment means to attach the front wheel assembly 100 to the rearwardly extending portion of the front parallel portions 82a, 82b of the front frame member 80. Generally, and except as noted below, the front wheel assembly 100 has substantially the same structure, features and operation as the rear wheel assembly 70 described above in connection with the embodiment of the invention illustrated in FIG. 1A and FIG. 1B. In addition, in this illustrated embodiment, the front wheel assembly attachment means used to attach the front wheel assembly 100 to the rearwardly extending portion of the front parallel portions 82a, 82b is substantially the same as the rear wheel assembly attachment means used to attach the rear wheel assembly 70 to the rearwardly extending portion of the rear parallel portions 23a, 23b of the distal frame portion 23, except that the front wheel clamp members 101 of the front wheel assembly 100 may be of a different geometry than that for the rear wheel clamp member 71 described above in connection with, and illustrated in, FIG. 6B. In the embodiment illustrated in FIG. 1A and FIG. 7A, the front wheel clamp members 101 have a shape similar to that illustrated in FIG. 6B. It is to be noted, however, that the front wheel assembly 100 does not have any chain sprocket members or a derailleur system. In addition, as illustrated in FIG. 7A, the front wheel clamp members 101 must be placed on the front parallel portions 82a and 82b in a manner so that the front wheel axle member is forward of an imaginary line running through the center of the longitudinal axis of the tubular member portion 25a of the steering mechanism 25. The distance along the front parallel portions 82a and 82b between the point of intersection of this imaginary line with the front parallel portions 82a and 82b and the front wheel axle member is known as "trail" in the relevant art. It should be noted that the front wheel assembly 100 may be attached at any location on the approximately rearwardly directed portion the front parallel portions 82a and 82b forward of the point of intersection of this imaginary line with the front parallel portions 82a and 82b. As a result, it is possible to vary the trail of the front frame member 80 by changing the position of the front wheel assembly 100. This is a feature not found in conventional bicycles. As in the embodiment of the rear wheel assembly 70 described above and illustrated in connection with FIG. 6B, either or both of the front wheel clamp members 101 may have openings therein that may be used for attachment of a disc brake system. In other embodiments of this first version of the invention, conventional caliper-type brake systems that create friction by clamping down on the outer rim of the front bicycle wheel 104 may also be used. Such caliper-type brake systems, which are well known in the art, may be connected to the front frame member 80 in any appropriate location and may be controlled by levers or other means located on the steering mechanism 25 that may be connected to the brake system by means of wires in a flexible sheath.

In the embodiment of this first version of the invention illustrated in FIG. 1A and FIG. 1B and FIG. 7A, the frame attachment means is comprised of a tubular member 25a, which is attached to the front frame head portion 81 and passes through a cylindrical opening 21a in the distal end of the rear frame head portion 21, such opening being of a size adapted to allow the tubular member 25a to rotate therein. In this embodiment, the front frame head portion 81 is attached to the tubular member 25a by means of a lower bolt and spacer 25b and an upper bolt and spacer 25c. In other embodiments, the frame attachment means may be any rotational attachment means commonly used with bicycles, which are currently known in the art or that may be developed in the art in the future. Such rotational attachment means are well known in the art. In various embodiments of the invention, lubricants or bearings or combinations thereof may be used to allow for easy rotation of the tubular member 25a within the cylindrical opening portion 21a of the front frame head portion 21. The steering mechanism 25 may also be comprised of conventional bicycle handlebars, which are not illustrated, but which are also well known in the art.

Figure 8A:
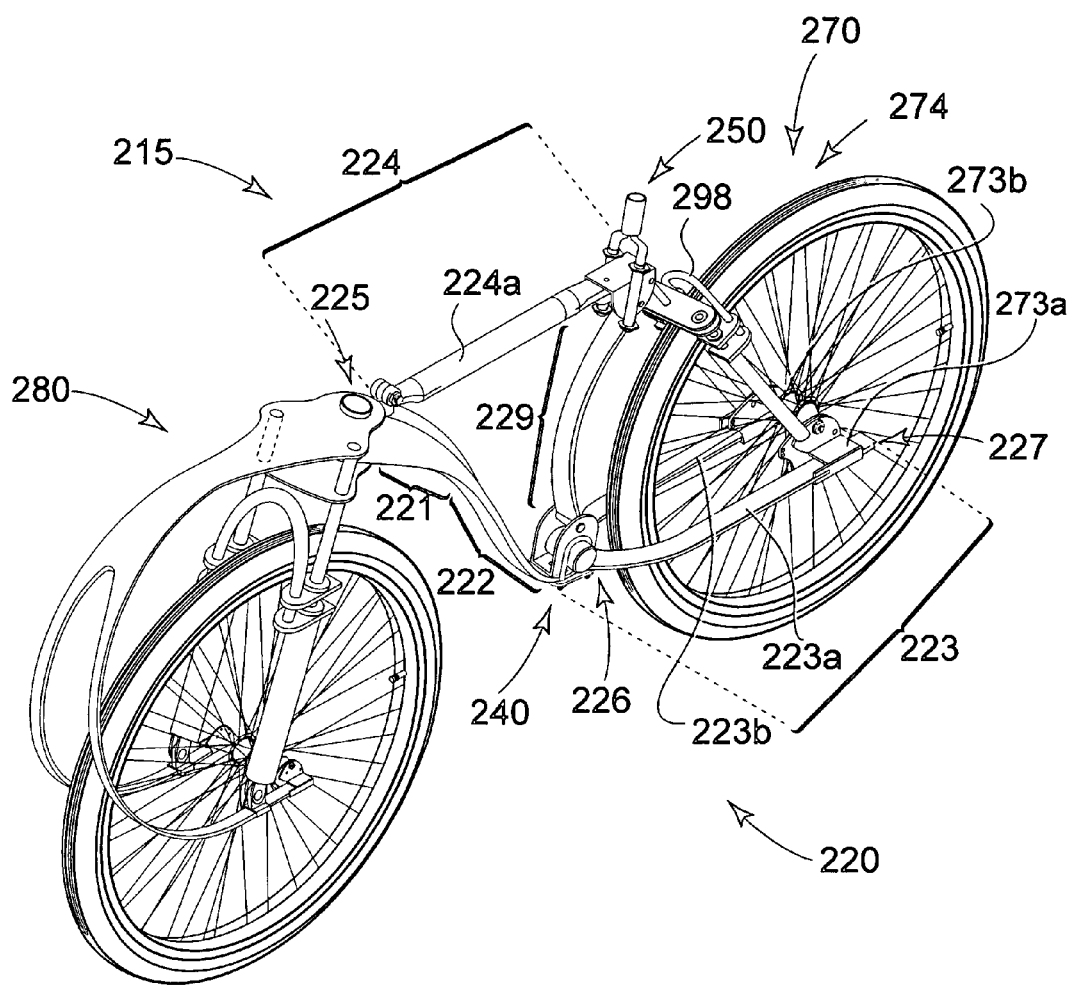
FIG. 8A is a perspective view of a first embodiment of a second version (a bicycle) of the invention, as viewed from the side of and above the bicycle.
Figure 8B:
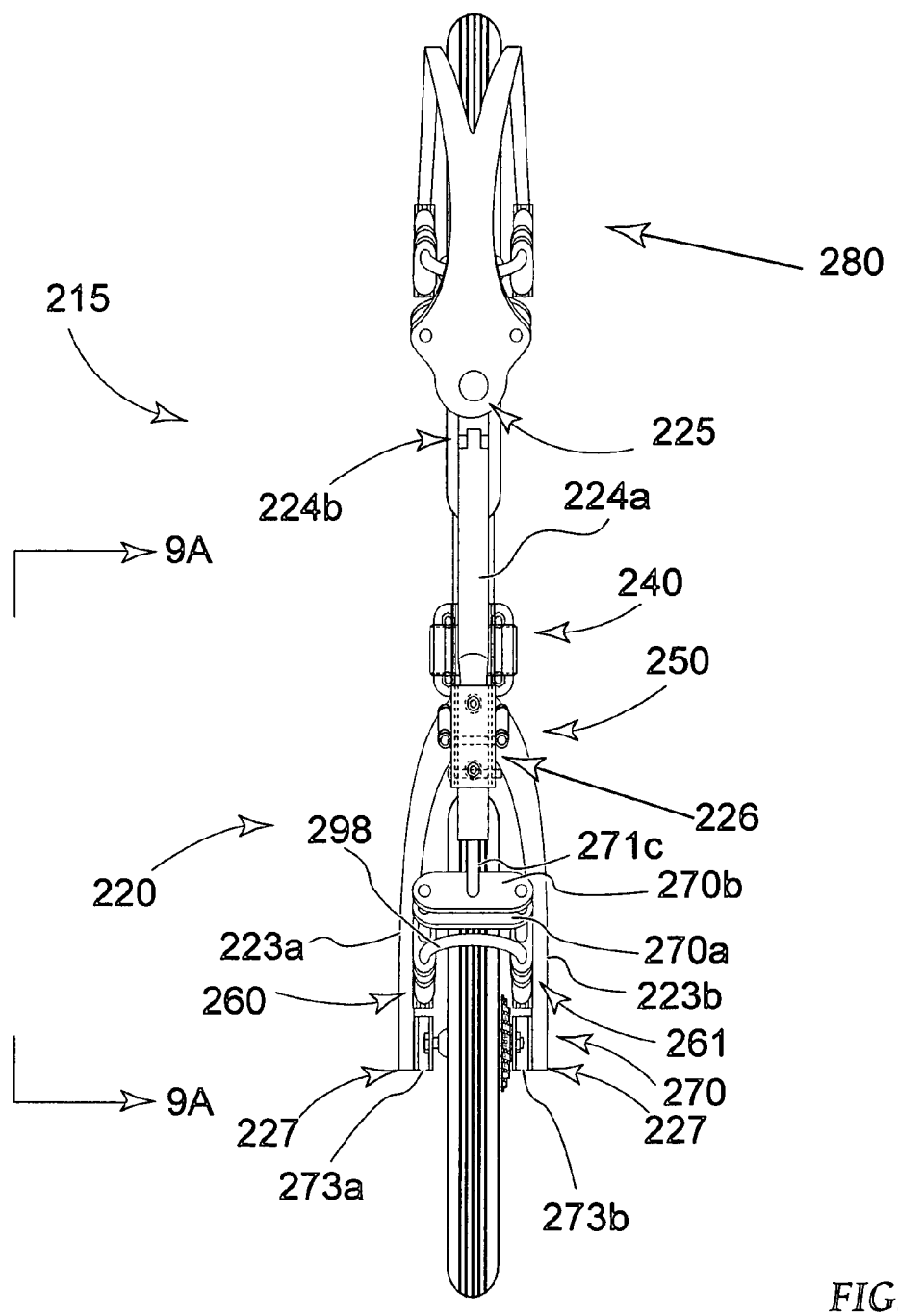
FIG. 8B is a plan view of the embodiment of the invention illustrated in FIG. 8A from above the bicycle.

One embodiment of a second version of the present invention is illustrated in FIG. 8A and FIG. 8B. In various embodiments of this second version, one aspect of the invention is a bicycle 215 comprised of a rear frame member 220, which is further comprised of a rear frame head portion 221, a downward frame portion 222, a distal frame portion 223, a rising frame portion 229, and a top frame portion 224. In some embodiments of this second version of the invention, the rear frame head portion 221 may be located adjacent to the steering mechanism 225 of the bicycle 215. The downward frame portion 222 extends generally downwardly in a rearward direction from the rear frame head portion 221 to the position of a crank assembly 240, which is described in more detail below. Although the crank assembly 240 is a part of the invention in the embodiment of the invention illustrated in FIG. 8A and FIG. 8B, the crank assembly 240 is not necessarily a part of the invention in all embodiments. The distal frame portion 223 extends in an approximately rearward direction from the position of the crank assembly 240 and is bifurcated at point 226 into two rear parallel portions 223a and 223b rearward of the position of the crank assembly 240 to permit a rear bicycle wheel 274 to fit between them. It is to be noted that by use of the term "parallel" to describe the two rear parallel portions 223a and 223b, it is intended that they may generally mirror one another in shape and need not necessarily be spaced an equal distance apart. The distance the two rear parallel portions 223a and 223b are split apart is dependent upon the width of a rear wheel assembly 270 (on which is mounted the rear bicycle wheel 274) that may be used with the rear frame member 220 in various embodiments of the invention, as described in more detail below. The two rear parallel portions 223a, 223b extend approximately rearwardly from the position of the crank assembly 240 to a rear termination point 227 aft of the position of a seat assembly 250, which is described in more detail below. The rising frame portion 229 extends approximately upwardly and forwardly from approximately the position of the crank assembly 240, and then approximately upwardly and rearwardly, generally circumscribing an arc, where it is joined to the top frame portion 224 at approximately the position of a seat assembly 250, which may be attached to the top frame portion 224 in some embodiments of this second version of the invention. In the embodiment of the invention illustrated in FIG. 8A and FIG. 8B, the rising frame portion 229 is attached to approximately the crank assembly 240 by means of lower end connecting means, which are described in more detail below, and the rising frame portion 229 is attached approximately to the seat assembly 250 by means of upper end connecting means, which are also described in more detail below. Although the seat assembly 250 is a part of the invention in the embodiment of the invention illustrated in FIG. 8A and FIG. 8B, the seat assembly 250 is not necessarily a part of the invention in all embodiments. In the embodiment of this second version of the invention illustrated in FIG. 8A and FIG. 8B, the rising frame portion 229 generally circumscribes an arc. Although the arc illustrated in the embodiment of FIG. 8A and FIG. 8B is approximately parabolic, in other embodiments the arc may be comprised of different types of curvatures (such as elliptical or circular shapes) or combinations of curvatures (such as approximately elliptical on the lower portion of the rising frame portion 229 and approximately circular on the top portion of the rising frame portion 229). The top frame portion 224 generally extends forwardly from the position of the seat assembly 250 to the rear frame head portion 221. In some embodiments of this second version of the invention, as illustrated in FIG. 8A and FIG. 8B, the top frame portion 224 may be comprised of a top frame member 224a having a portion with a circular-shaped or inverted U-shaped cross section that is joined at one end to the rear frame head portion 221 by means of a shock absorbing hinge 224c with a threaded pin. In other embodiments of this first version of the invention, the top frame portion 224 may be joined to the rear frame head portion 221 by any means used to join the top frame member 24 to the rear frame head portion 21 of the first version of the invention, as described above and illustrated in connection with FIG. 1A and FIG. 1B. In addition, the rear frame head portion 221 in various embodiments of this second version of the invention may have substantially the same structure, features and characteristics as the rear frame head portion 21 of the first version of the invention, as described above and illustrated in connection with FIG. 1A through FIG. 1C.

In some embodiments of this second version of the invention, as illustrated in FIG. 8A and FIG. 8B, the rear frame head portion 221, the downward frame portion 222, the distal frame portion 223, the rising frame portion 229, and the top frame portion 224 are comprised of materials from the group consisting of flexible materials, semi-rigid materials, and combinations of such materials. It is to be noted, however, that such materials may provide for flexure in one or more directions, but may provide a degree of rigidity in other directions. For example, various portions of the rear frame member 220 may be constructed of titanium, steel, steel alloys, or aluminum. In these embodiments, the titanium, steel, steel alloys, or aluminum may be oriented so that a relatively high degree of flexure is provided in the vertical direction (when viewing the rear frame member 220 from the perspective of a standing bicycle 215), but a relatively low degree of flexure is provided in the horizontal direction. Thus, a rear frame head portion 221, a downward frame portion 222, a distal frame portion 223, a rising frame portion 229, and a top frame portion 224 comprised of titanium, steel, steel alloy, or aluminum would allow the rear frame member 220 to flex up and down, but not to the sides. Generally, the widths and thicknesses of the various portions of the rear frame member 220 are dependent upon the size of the rear frame member 220, its anticipated use, and the characteristics of the materials used to construct the rear frame member 220. In the embodiment of the invention illustrated in FIG. 8A and FIG. 8B, the width of the rear frame head portion 221 depends upon the material used to construct the rear frame head portion 221. Such width is great enough to provide adequate support for the weight to be supported by the rear frame member 220, but small enough to retain the desired degree of flexibility of the rear frame member 220. More preferred, the rear frame head portion 221 has a width that varies from ¾ inches to 2 inches, as viewed from above the rear frame member 220 (as illustrated in FIG. 8B). The length of the rear frame head portion 221 adjacent to the steering mechanism 225 is dependent upon a number of factors, such as the anticipated use and size of the bicycle 215. It is preferred, however, that such length be between 10 inches and 14 inches. It is to be noted, however, that all or part of the portion of the rear frame head portion 221 adjacent to the bicycle steering mechanism 225 may be constructed entirely of a rigid material (such as titanium, steel, steel alloy, or aluminum) to withstand the forces associated with steering the bicycle 215. In the embodiment of the invention illustrated in FIG. 8A and FIG. 8B, the widths and thicknesses of the downward frame portion 222, the distal frame portion 223 (except the rear parallel portions 223a and 223b), the rising frame portion 229, and the top frame portion 224 depend upon the material used to construct the downward frame portion 222, the distal frame portion 223 (except the rear parallel portions 223a and 223b), the rising frame portion 229, and the top frame portion 224, respectively. Such widths and thicknesses are great enough to provide adequate support for the weight to be supported by the rear frame member 220, but small enough to retain the desired degree of flexibility of the rear frame member 220. More preferred, the downward frame portion 222, the distal frame portion 223 (except the rear parallel portions 223a and 223b), and the top frame portion 224 have a width that varies from ¾ inches to 2 inches, as viewed from above the rear frame member 220 (as illustrated in FIG. 8B), and a thickness that varies from ⅛ inches to ½ inches. In the embodiment of the invention illustrated in FIG. 8A and FIG. 8B, the widths and thicknesses of the rear parallel portions 223a and 223b are approximately the same and depend upon the material used to construct the rear parallel portions 223a and 223b. Such widths and thicknesses are great enough to provide adequate support for the weight to be supported by the rear frame member 220, but small enough to retain the desired degree of flexibility of the rear frame member 220. Most preferred, the rear parallel portions 223a and 223b have a width that varies from ⅜ inches to 1 inch, as viewed from above the rear frame member 220 (as illustrated in FIG. 8B). In the embodiment of the invention illustrated in FIG. 8A and FIG. 8B, the rear frame head portion 221, the downward frame portion 222, the distal frame portion 223, the rising frame portion 229, and the top frame portion 224 may be constructed in whole or in part of any materials currently known in the art or that may be developed in the art in the future that provide an adequate level of support for the anticipated load to be borne by the rear frame member 220, while still maintaining the flexible nature of the rear frame member 220. Examples include carbon fiber composites, steel, steel alloys, aluminum, titanium, other metals, fiberglass, plastics, rubber, or wood or laminates or any combinations of the same. Examples of suitable wood laminates include layers of oak, ebony, lignum vitae, and teak or combinations of the same, which are inter-layered with adhesive materials suitable to permanently bind the wood layers of the laminate together. It is also to be noted that the above materials may also be laminated with one another. For example, portions of the rear frame member 220 may be comprised of laminates of carbon fiber composites and titanium, carbon fiber composites and fiberglass, or carbon fiber composites and wood. It is also to be noted that the various portions of the rear frame member 220 may be constructed of combinations of materials in different embodiments of the invention. For example, the downward frame portion 222 may be constructed of titanium and the distal end portion 223 may be constructed of a carbon fiber composite and wood laminate. It is preferred, however, that all portions of the rear frame member 220 be constructed of the same material for ease in manufacturing the rear frame member 220. In the embodiment of the invention illustrated in FIG. 8A and FIG. 8B, the downward frame portion 222, the distal frame portion 223, the rising frame portion 229, and a portion of the top frame portion 224 each have a cross-section shaped as a rectangle, while the remaining portion of the top frame portion 224 has a circular-shaped or inverted U-shaped cross section. In other embodiments of this first version of the invention, however, the cross-section of the downward frame portion 222, the distal frame portion 223, the rising frame portion 229, and the top frame portion 224 may be of almost any shape desired by the user of the rear frame member 220. For example, the downward frame portion 222, the distal frame portion 223, the rising frame portion 229, and the top frame portion 224 may be of other shapes, such as a circle or an ellipse, or a parallelogram, a trapezoid, a square, a rectangle, or any combination thereof having one or more concave or convex arched surfaces, or any combination of all such shapes. The preferred cross-sectional shape of the various portions of the rear frame member 220 is dependent upon the taste of the user of the rear frame member 220 and the materials used to construct the various portions of the rear frame member 220. The more preferred shapes are rectangular, rectangular with an arched surface, U-shaped, square or a combination of one or more of such shapes.

Figure 9A:
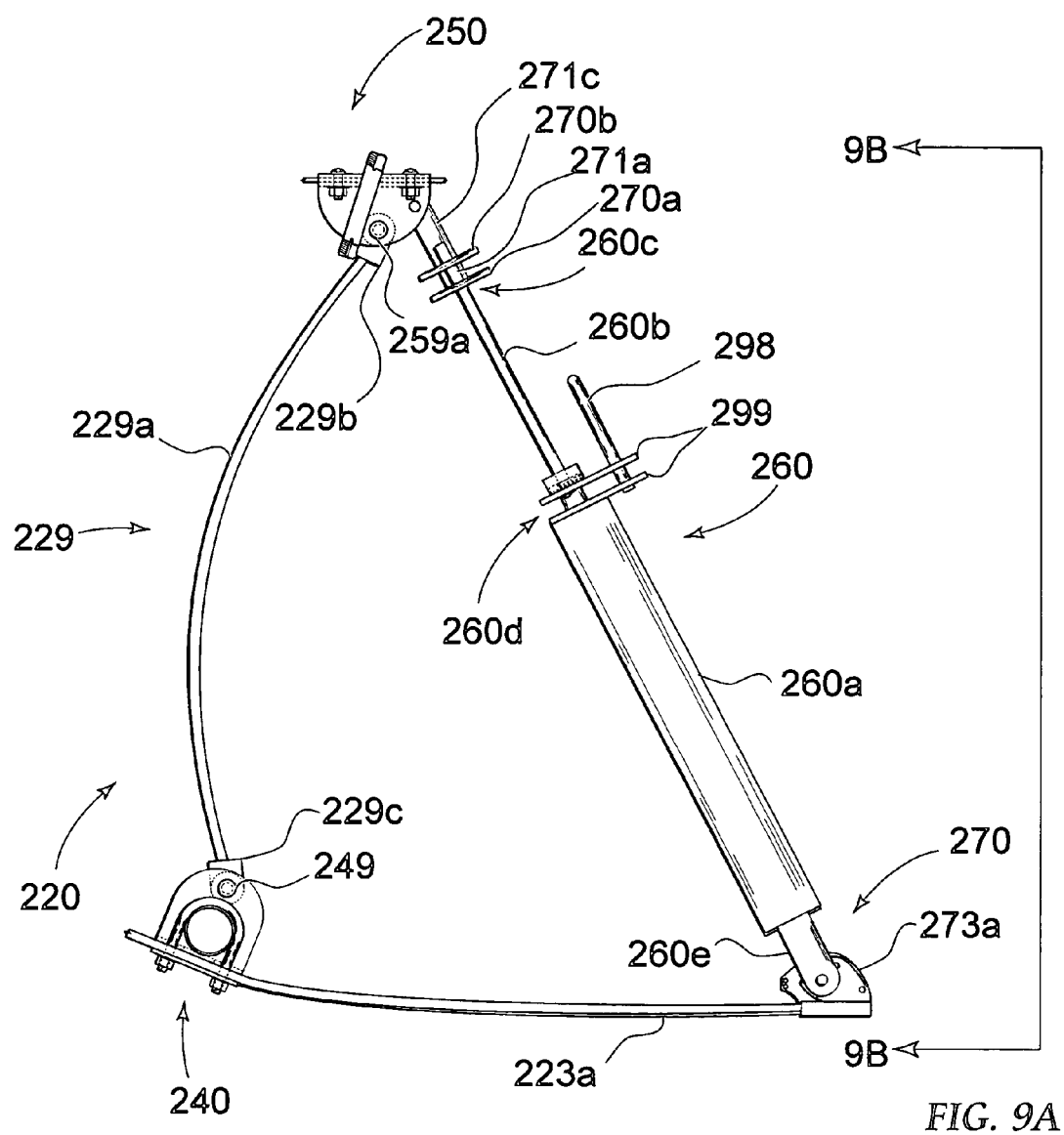
FIG. 9A is an elevation view of the embodiment of the rear frame member illustrated in FIG. 8A and FIG. 8B, but without the rear bicycle wheel, as viewed from the side of the bicycle along the line 9A-9A in FIG. 8B.
Figure 10:
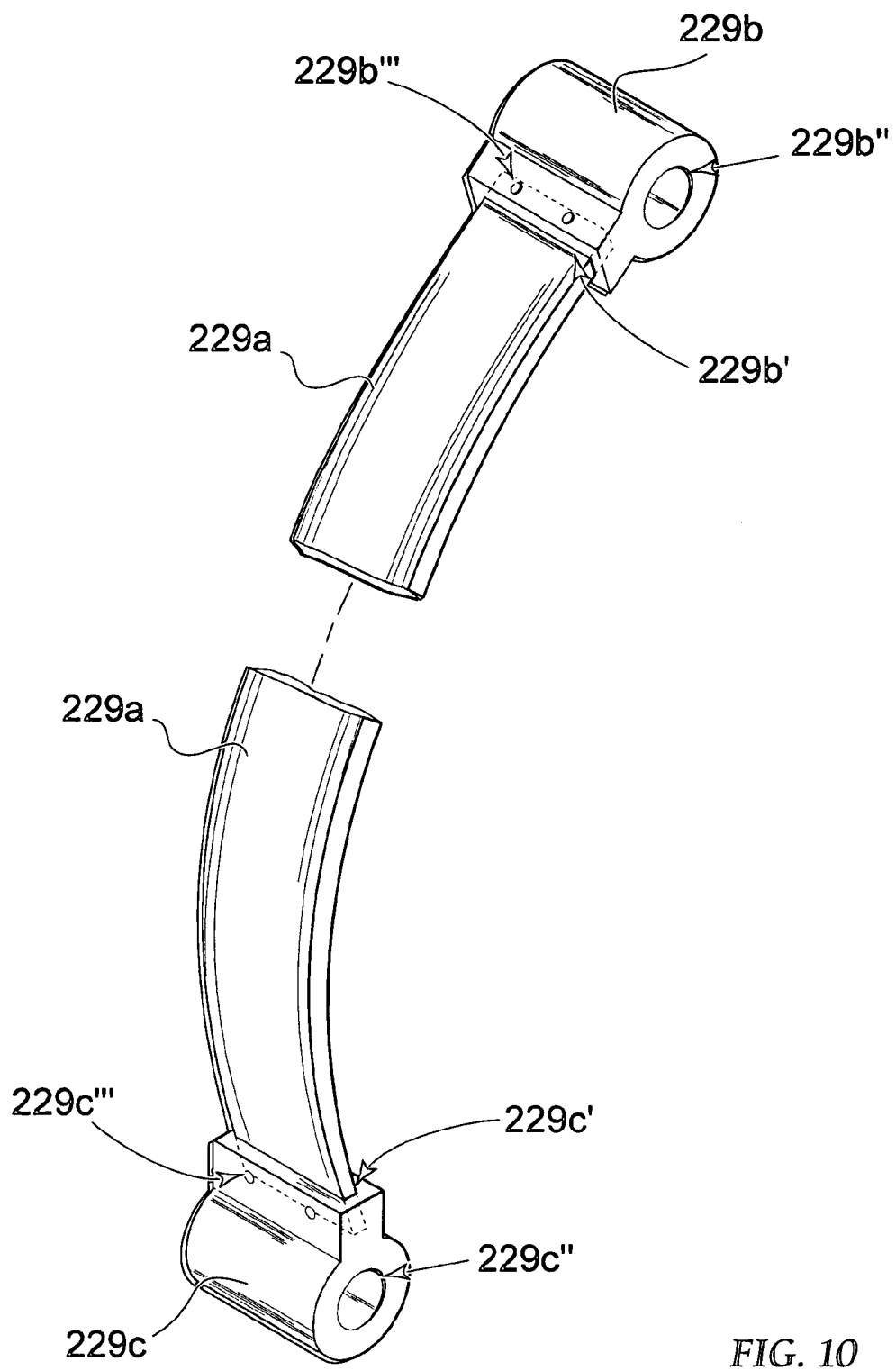
FIG. 10 is an enlarged perspective view of the embodiment of the rising frame portion of the rear frame member illustrated in FIG. 8A, FIG. 8B, FIG. 9A, and FIG. 9B, as viewed from the side of and above the rising frame portion.

In the embodiment of the second version of the invention illustrated in FIG. 8A and FIG. 8B, the lower end connecting means is used to attach the rising frame portion 229 to the crank assembly 240, and the upper end connecting means is used to attach the rising frame portion 229 to the seat assembly 250 in the manner illustrated in FIG. 9A, and more particularly in greater detail in FIG. 10. Referring to FIG. 10, the rising frame portion 229 of this embodiment is comprised of a frame member 229a, an upper connecting bracket 229b, and a lower connecting bracket 229c. The top end of the frame member 229a is inserted into an indentation 229b' in the end of the upper connecting bracket 229b, the indentation 229b' being approximately the same size and shape as the top end of the frame member 229a, so that the indentation 229b' receives the top end of the frame member 229a. The other end of the upper connecting bracket 229b has a cylindrical opening therein 229b". The top end of the frame member 229a has at least one hole therein, and the upper connecting bracket 229b has at least one hole 229b''' therein, that are positioned in a manner so that when the top end of the frame member 229a is inserted into the indentation 229b' in the upper connecting bracket 229b, the hole in the frame member 229a aligns with the hole 229b''' in the upper connecting bracket 229b. In this embodiment, the frame member 229a is connected to the upper connecting bracket 229b by means of a rivet positioned within the at least one hole 229b'''. In other embodiments, the frame member 229a may be connected to the upper connecting bracket 229b using other suitable means, such as bolt, nut and lock washer combinations, pin and cotter pin, screws, quick release fasteners, and other fastening means and combinations of all such fastening means currently known in the art or developed in the art in the future. As illustrated in FIG. 10, the preferred number of such holes 229b''' is two. In the embodiment of the rising frame portion 229 illustrated in FIG. 10, the bottom end of the frame member 229a is inserted into an indentation 229c' in the end of the lower connecting bracket 229c, the indentation 229c' being approximately the same size and shape as the bottom end of the frame member 229a, so that the indentation 229c' receives the bottom end of the frame member 229a. The other end of the lower connecting bracket 229c has a cylindrical opening therein 229c". The bottom end of the frame member 229a has at least one hole therein, and the lower connecting bracket 229c has at least one hole 229c''' therein, that are positioned in a manner so that when the bottom end of the frame member 229a is inserted into the indentation 229c' in the lower connecting bracket 229c, the hole in the frame member 229a aligns with the hole 229c''' in the lower connecting bracket 229c. In this embodiment, the frame member 229a is connected to the lower connecting bracket 229c by means of a rivet positioned within the at least one hole 229c'''. In other embodiments, the frame member 229a may be connected to the lower connecting bracket 229c using other suitable means, such as bolt, nut and lock washer combinations, pins and cotter pins, screws, quick release fasteners, and other fastening means and combinations of all such fastening means currently known in the art or developed in the art in the future.

In the embodiment of the second version of the invention illustrated in FIG. 9A, the upper connecting bracket 229b of the rising frame portion 229 is connected to the connecting port 259a of the seat assembly 250 and the lower connecting bracket 229c of the rising frame portion 229 is connected to the hole 249 of the crank assembly 240. In this illustrated embodiment, the upper end connecting means used to connect the upper connecting bracket 229b to the connecting port 259a of the seat assembly 250 and the lower end connecting means used to connect the lower connecting bracket 229c to the hole 249 of the crank assembly 240 are a pin and cotter pin. In other embodiments, the upper connecting bracket 229b may be connected to the connecting port 259a of the seat assembly 250 and the lower connecting bracket 229c may be connected to the hole 249 of the crank assembly 240 using other suitable means, such as bolt, nut and lock washer combinations, screws, rivets, quick release fasteners, and other fastening means and combinations of all such fastening means currently known in the art or developed in the art in the future. In still other embodiments of the invention, the top end of the rising frame member 229 may be connected to the top frame portion 224 using other upper end connecting means. In yet other embodiments of the invention, the bottom end of the rising frame member 229 may be connected to the downward frame portion 222 or the distal frame portion 223 using other lower end connecting means. For example, the upper end connecting means and the lower end connecting means may include any suitable means, such as welding, adhesives, epoxies, pins, screws, bolt, nut and lock washer combinations, rivets, quick release fasteners, and other fastening means and combinations of all such fastening means currently known in the art or developed in the art in the future, to connect the rising frame portion 229 to the top frame portion 224, the downward frame portion 222, or the distal frame portion 223, as appropriate.

In the embodiment of the second version of the invention illustrated in FIG. 8A and FIG. 8B, the rear frame member 220 is further comprised of a crank assembly 240, a seat assembly 250, and a rear wheel assembly 270. In such embodiment, the crank assembly 240, the seat assembly 250, and the rear wheel assembly 270 have substantially the same characteristics as the various embodiments of the crank assembly 40, the seat assembly 50, and the rear wheel assembly 70, respectively, in the embodiment of the invention illustrated in, and herein described in connection with, FIG. 1A and FIG. 1B. Similarly, any means to attach the crank assembly 240, the seat assembly 250, the rear wheel assembly 270 to any other component, portion, aspect, assembly, or member of the rear frame member 220 may have substantially the same characteristics and features as in the embodiment of the invention illustrated in, and herein described in connection with, FIG. 1A and FIG. 1B. It is to be noted, however, that other embodiments of this second version of the invention may not have any such assemblies, or may have any combination of such assemblies, in which embodiments the assemblies have substantially the same characteristics as the various embodiments of the crank assembly 40, the seat assembly 50, and the rear wheel assembly 70 in the embodiment of the invention illustrated in, and herein described in connection with, FIG. 1A and FIG. 1B. It is also to be noted that the rear frame member 220 generally disclosed and described herein in conjunction with FIG. 8A and FIG. 8B, as one aspect of the bicycle frame 215, may alone be a separate embodiment of this second version of the invention. In the embodiment of the second version of the invention illustrated in FIG. 8A and FIG. 8B, the bicycle frame 215 is further comprised of a front frame member 280. The front frame member 280 generally disclosed and described herein in conjunction with FIG. 8A and FIG. 8B, as a second aspect of the bicycle frame 215, may alone be a separate embodiment of this second version of the invention. In all embodiments of this second version of the invention further comprising a front frame member 280, the front frame member 280 has substantially the same characteristics as the various embodiments of the front frame member 80 described herein and illustrated in connection with FIG. 1A, FIG. 1B, and FIG. 7A through FIG. 7C. Similarly, any means used to attach the front frame member 280 to the rear frame member 220 may have substantially the same characteristics and features as in the embodiments of the invention illustrated in, and herein described in connection with, FIG. 1A, FIG. 1B, and FIG. 7A. It is also to be noted that in some embodiments in this second version of the invention, the bicycle frame 215 may comprise the rear frame member 220 and a front frame portion that is substantially the same as front fork assemblies commonly used with conventional bicycles, rather than the front frame member 80 illustrated in FIG. 8A and FIG. 8B. Such front fork assemblies are well known in the art. It is also to be noted that in some embodiments in this second version of the invention, the front frame member 280 may further comprise a rear frame portion that is substantially the same as rear frame portions commonly used with conventional bicycles, rather than the rear frame member 220 illustrated in FIG. 8A and FIG. 8B. Such rear frame portions are also well known in the art.

Figure 9B:
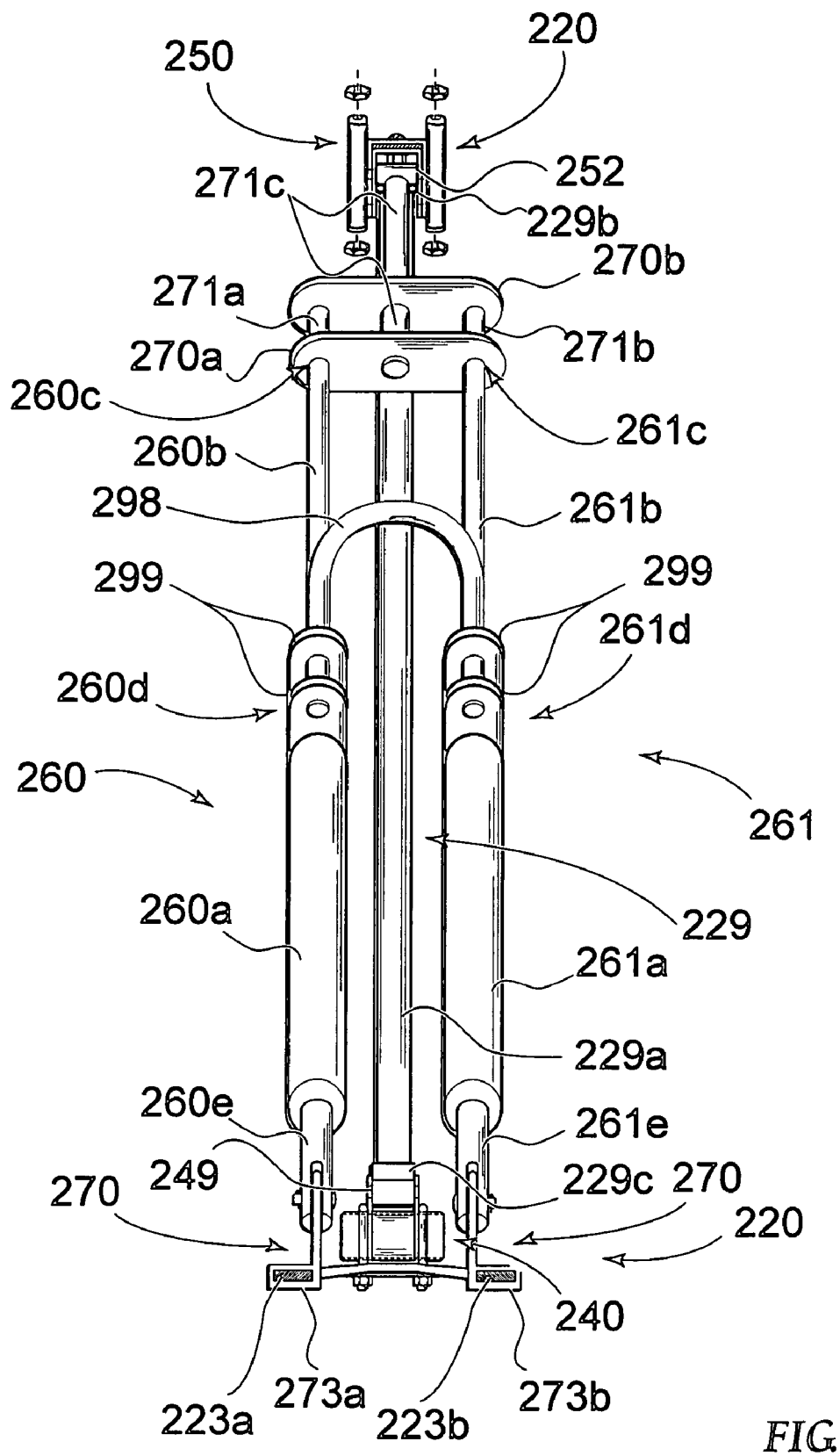
FIG. 9B is an elevation view of the embodiment of the rear frame member illustrated in FIG. 8A and FIG. 8B, but without the rear bicycle wheel, as viewed from the rear of the bicycle along the line 9B-9B in FIG. 9A.

In the embodiment of the second version of the invention illustrated in FIG. 8A and FIG. 8B, the rear frame member 220 is further comprised of at least two rear strut members 260, 261. An elevation view of this embodiment of the rear frame member 220 from the side of the bicycle 215 is provided in FIG. 9A, and an elevation view of the rear frame member 220 from the rear of the bicycle 215 (along the lines 9B-9B in FIG. 9A, but without the rear wheel assembly 270) is provided in FIG. 9B. In this embodiment, in which the rear frame member 220 is further comprised of the preferred number (two) of rear strut members 260, 261, the two rear strut members 260, 261 have substantially the same structure, features and operations as the at least one rear strut member 60 described above in connection with FIG. 5B, except as noted otherwise in the following description of the at least two strut members 260, 261. In this embodiment, each rear strut member 260, 261, as illustrated in FIG. 9A and FIG. 9B, has a strut shroud 260a, 261a, respectively (including a piston tube assembly therein), a piston rod member 260b, 261b, respectively, with a threaded top end 260c, 261c, respectively, a rod guide member 260d, 261d, respectively, and a bottom rear support bracket 260e, 261e, respectively. In this embodiment, the top rear strut member connector means, which is used to connect the rear strut members 260, 261 to the seat assembly 250 of the rear frame member 220, is comprised of plate members 270a, 270b and tube members 271a, 271b, 271c, wherein the bottom end of tube members 271a and 271b are connected to and extend through plate member 270a to the lower surface of plate member 270a, and the top end of the tube members are connected to plate member 270b. In this embodiment, the tube members 271a, 271b have threads on their interior surface of a size and shape adapted to receive threaded top ends 260c, 261c of the piston rod members 260b, 261b, and threaded top ends 260c, 261c of the piston rod members 260b, 261b are screwed into such ends of the tube members 271a, 271b. Also in this embodiment, the tube member 271c is further comprised of an upper bracket member 252, wherein the tube member 271c is connected to plate members 270a and 270b at one end, and is connected to the seat assembly 250 by means of the upper bracket member 252 at the other end. The upper bracket member 252 in this embodiment has substantially the same structure, features and characteristics as the top rear strut support bracket 61 described and illustrated above in connection with FIG. 5A and FIG. 5B, and is connected to the seat assembly 250 using substantially the same means as is used to connect the top rear strut support bracket 61 to the seat assembly 50, as described and illustrated above in connection with FIG. 5A and FIG. 5B. In this embodiment, the tube members 271a, 271b, 271c may be connected to the plate members 270a, 270b by means of welding, adhesives, epoxies, pins, screws, quick release fasteners, and other fasteners and means and combinations of all such fastening means currently known in the art or that may be developed in the art in the future. In addition, the tube members 271a, 271b, 271c and the plate members 270a, 270b may be constructed of almost any suitable rigid material, such as titanium, steel, steel alloys, aluminum or other metal, high strength plastics, composite materials, laminates and other materials currently known in the art or developed in the art in the future. It is to be noted, however, that in other embodiments of this second version of the invention, the top rear strut connector means may be any suitable connecting means currently known in the art or that may be developed in the art in the future. For example, rather than the plate members 270a, 270b and tube members 271a, 271b, 271c, members of different geometries and materials and different means of connecting the piston rod members 260b, 261b to the seat assembly 250 may be used as the top rear strut connector means. In addition, in still other embodiments, the rear strut members 260, 261 may be connected to another portion of the rear frame member 220, such as the rear distal end of the top frame portion 224, rather than the seat assembly 250. All such means are within the scope of the invention, as defined by the appended claims. In the embodiment of this second version of the invention illustrated in FIG. 8A, FIG. 8B, FIG. 9A, and FIG. 9B, the bottom rear strut member connector means, which is used to connect the rear strut members 260, 261 to the rear wheel assembly 270 of the rear frame member 220, is comprised of the bottom rear support brackets 260e, 261e, which are connected to the rear wheel clamp members 273a, 273b, respectively. In this embodiment, the rear support brackets 260e, 261e have substantially the same structure, features and characteristics as the bottom front support bracket 96 of the front strut member 91, as described and illustrated above in connection with FIG. 7B and FIG. 7C, and the rear wheel clamp members 272 have substantially the same structure, features and characteristics as the rear wheel clamp members 72, as described and illustrated above in connection with FIG. 6A and FIG. 6B. It is to be noted, however, that in other embodiments of this second version of the invention, the bottom rear strut connector means may be any suitable connecting means currently known in the art or that may be developed in the art in the future. For example, a bracket having a different geometry and different means of connecting the rear support brackets 260e, 261e to the rear wheel assembly 270 may be used as the bottom rear strut connector means. In addition, in still other embodiments, the rear strut members 260, 261, may be connected to another portion of the rear frame member 220, such as the rear parallel portions 223a, 233b of the distal frame portion 223, rather than the rear wheel assembly 270, or the rear distal portion of the top frame portion 224, rather than the seat assembly 250. All such means are within the scope of the invention, as defined by the appended claims.

In the embodiment of the invention illustrated in FIG. 8A, FIG. 8B, FIG. 9A and FIG. 9B, the rear frame member 220 further comprises a stabilizing loop member 298 having two ends and guide attachment plates 299 as loop attachment means to attach each end of the stabilizing loop member 298 to the rod guide members 260d, 261d of each of the two rear strut members 260, 261. In this embodiment, the guide attachment plates 299 may be attached to the rod guide members 260d, 261d of each of the two rear strut members 260, 261 using any suitable means, such as welding, adhesives, epoxies, pins, screws, quick release fasteners, and other fasteners and combinations of all such fastening means currently known in the art or developed in the art in the future. The same means may also be generally used to attach the stabilizing loop member 298 to the guide attachment plates 299.

What is claimed is:

1. A bicycle or velocipede frame comprising a front frame member, wherein the front frame member is comprised of
    a front frame head portion, and
    two front parallel portions that extend forwardly from the front frame head portion, then downwardly and forwardly, and then downwardly and rearwardly, circumscribing an arc until the two front parallel portions are extending approximately rearwardly, wherein the two front parallel portions are separated by a distance adequate to permit a front bicycle wheel to fit between them,
    the front frame head portion comprised of a top plate member, at least two tubular members, a bottom plate member, and front head attachment means to attach the top plate member to one end of each of the at least two tubular members and to attach the bottom plate member to the other end of each of the at least two tubular members,
    the front frame head portion and the two front parallel portions further comprised of materials from the group consisting of flexible materials, semi-rigid materials, and combinations of such materials,
    the two front parallel portions each having a cross section shaped as a circle, an ellipse, a square, a rectangle, a parallelogram, a trapezoid, or any combination thereof having one or more concave or convex arched surfaces,
    the front frame member further comprised of a front wheel assembly; and front wheel assembly attachment means to removably attach the front wheel assembly to the rearwardly extending portion of the front parallel portions of the front frame member.

2. The bicycle or velocipede frame of claim 1, wherein the front wheel assembly is comprised of,
    at least two front wheel assembly clamp members
    front clamp attachment means to removably attach each of the at least two front wheel assembly clamp members to the rearwardly extending portion of a front parallel portion of the front frame member
    a cylindrical front wheel axle member having two ends, wherein the front wheel axle member extends between the at least two front wheel assembly clamp members
    front wheel axle attachment means to connect each end of the front wheel axle member to one of the at least two front wheel assembly clamp members;
    a front bicycle wheel; and
    front wheel mounting means to rotationally mount the front bicycle wheel on the front wheel axle member.

3. The bicycle or velocipede frame of claim 2, wherein the at least two front wheel clamp members may be removably attached to the approximately rearwardly extending portion of the front parallel portions of the front frame member in more than one position along the longitudinal axis of the approximately rearwardly extending portion of the front parallel portions.

4. The bicycle or velocipede frame of claim 2, wherein the at least two front wheel clamp members are each comprised of,
    a front wheel assembly outer plate, comprised of a first outer vertical plate portion having a flat surface, a second outer vertical plate portion having a flat surface parallel to the first outer vertical plate portion, and a horizontal outer plate portion extending perpendicular from the flat surface at one end of the first outer vertical plate portion to the flat surface at one end of the second outer vertical plate portion creating an approximately U-shaped member, wherein the interior surface of the outer horizontal plate portion is flat, and
    a front wheel assembly inner plate, which is comprised of an inner vertical plate portion having a flat surface and a horizontal inner plate portion extending perpendicular from the flat surface at one end of the first inner vertical plate portion creating an approximately L-shaped member, wherein the exterior surface of the horizontal inner plate portion is flat,
    a front wheel clamp attachment means to connect the front wheel assembly outer plate to the front wheel assembly inner plate,
    the flat surface of the first outer vertical plate portion placed adjacent to the flat surface of the inner vertical plate portion and the flat interior surface of the horizontal outer plate portion and the rear clamp attachment means comprised of the flat exterior surface of the horizontal inner plate being placed adjacent to the front parallel portion of the front frame member to which the front wheel clamp member removably attached so that the front parallel portion is held in place relative to the front wheel clamp member by the front wheel assembly inner plate and the front wheel assembly outer plate.

5. The bicycle or velocipede frame of claim 2, wherein each front parallel portion of the front frame member further comprises at least one pin and the front wheel assembly clamp member further comprises at least one hole, wherein there is at least one hole for each at least one pin, and each at least one pin is inserted into one at least one hole to hold the front wheel assembly in place relative to the front parallel portion.

6. The bicycle or velocipede frame of claim 2, wherein the front frame member further comprises
- at least two front strut members, wherein each of the at least two front strut members has a top end and a bottom end,
- top front strut connector means to connect each top end of the at least two front strut members to the front frame head portion, and
- bottom front strut connector means to connect each bottom end of the at least two front strut members to one of the rearwardly extending front parallel portions,
- wherein each of the at least two front strut members is located on one side of the front bicycle wheel.

7. The bicycle or velocipede frame of claim 6, wherein each of the at least two front strut members is comprised of
- a piston tube assembly, comprised of
  - a piston rod member, wherein the top end of the piston rod member is connected to the front frame head portion using the top front strut connector means,
  - a piston tube member,
  - a top valve monoblock member,
  - a bottom valve monoblock member monoblock/piston tube attachment means to attach the top valve monoblock member to the piston tube member and to attach the bottom valve monoblock member to the piston tube member,
  - bottom strut support member and bottom monoblock/support attachment means to attach the bottom strut support member to the bottom valve monoblock member, wherein the bottom strut support member is connected to approximately one of the rearwardly extending front parallel portions using the bottom front strut connector means,
  - rod guide member and monoblock/guide attachment means to attach the rod guide member to the top valve monoblock member, and
- a strut shroud member covering the piston tube assembly, the piston tube assembly operated by means of air pressure.

* * * * *